United States Patent [19]
Johnson

[11] Patent Number: 5,920,417
[45] Date of Patent: *Jul. 6, 1999

[54] MICROELECTROMECHANICAL TELEVISION SCANNING DEVICE AND METHOD FOR MAKING THE SAME

[75] Inventor: Michael D. Johnson, Madison, Ala.

[73] Assignee: Medcam, Inc., Bellevue, Wash.

[ * ] Notice: This patent is subject to a terminal disclaimer.

[21] Appl. No.: 08/583,045

[22] PCT Filed: Jul. 19, 1994

[86] PCT No.: PCT/US94/08165

§ 371 Date: Apr. 24, 1996

§ 102(e) Date: Apr. 24, 1996

[87] PCT Pub. No.: WO95/03562

PCT Pub. Date: Feb. 2, 1995

Related U.S. Application Data

[63] Continuation-in-part of application No. 08/093,580, Jul. 19, 1993, Pat. No. 5,673,139.

[51] Int. Cl.$^6$ .......................... G02B 26/08; G02B 26/10; G02B 7/198
[52] U.S. Cl. .......................... 359/223; 359/224; 359/298; 348/203; 348/205; 235/462.33; 235/462.36
[58] Field of Search .......................... 257/415; 359/296, 359/271, 846, 291–295, 298, 223, 224, 318; 348/203, 205; 235/462.33, 462.36

[56] References Cited

U.S. PATENT DOCUMENTS

| | | | |
|---|---|---|---|
| 3,471,641 | 10/1969 | Baker et al. | 178/7.6 |
| 4,073,567 | 2/1978 | Lakerveld et al. | 350/6.5 |
| 4,230,393 | 10/1980 | Burke | 350/6.5 |
| 4,317,611 | 3/1982 | Petersen | 359/223 |
| 4,450,458 | 5/1984 | Araghi et al. | 359/291 |
| 4,708,420 | 11/1987 | Liddiard | 350/6.6 |
| 4,854,687 | 8/1989 | Fletcher | 359/223 |
| 5,016,072 | 5/1991 | Greiff | 357/26 |
| 5,097,354 | 3/1992 | Goto | 359/212 |
| 5,123,812 | 6/1992 | Greiff | 357/25 |
| 5,606,447 | 2/1997 | Asada et al. | 359/224 |
| 5,629,790 | 5/1997 | Neukermans et al. | 359/198 |

FOREIGN PATENT DOCUMENTS

| | | |
|---|---|---|
| 60-107017 | 7/1985 | Japan . |
| 61-118717 | 6/1986 | Japan . |
| 3-264911 | 11/1991 | Japan . |
| 6-208070 | 7/1994 | Japan . |

OTHER PUBLICATIONS

IEEE Proceedings, 1991, pp. 614–617.

Jaecklin et al, "Mechanical and Optical Properties . . . " $7^{th}$ Int'l Conf. on Solid–State Sensors & Actuators, 1993, pp. 958–961.

Kleiman et al, "Torsional Oscillators," Rev. Sci Inst. 56(11). Nov., 1985 pp. 2088–2091.

Buser et al., "Very High Q–factor . . . " Sensors & Actuators, A21–A23 (1990) pp. 323–327.

Goto & Imanaka, "Super Compact Dual Axis Optical Scanning Unit Applying a Tortional Spring Resonator Driven by a Piezoelectric Actuator,"SPIE, vol. 1544, pp. 272–81.

Breng et al., "Electrostatic Micromechanic Actuators," (1992).

Rowe & Muller, "Polycrystalline and Amorphous Silicon Micromechanical Beams: Annealing and Mechanical Properties," Sensors and Actuators, vol. 4, pp. 447–54 (1983).

Pedder & Howe, "Thermal Assembly of Polysilicon Microstructures," IEEE (1991).

Petersen, "Silicon Torsional Scanning Mirror,"IBM J. Research Development, vol. 24, No. 5 (Sep. 1980).

*Primary Examiner*—Georgia Epps
*Assistant Examiner*—Margaret Burke

[57] ABSTRACT

A single reflector, two-axis MEMS scanner made of a substrate. The substrate has nested, cut-out regions. Each region is independently rotatable about one of the axes. The axes of the regions are substantially orthogonal.

9 Claims, 27 Drawing Sheets

| FIG. 30a | FIG. 30b | FIG. 30c | FIG. 30d |

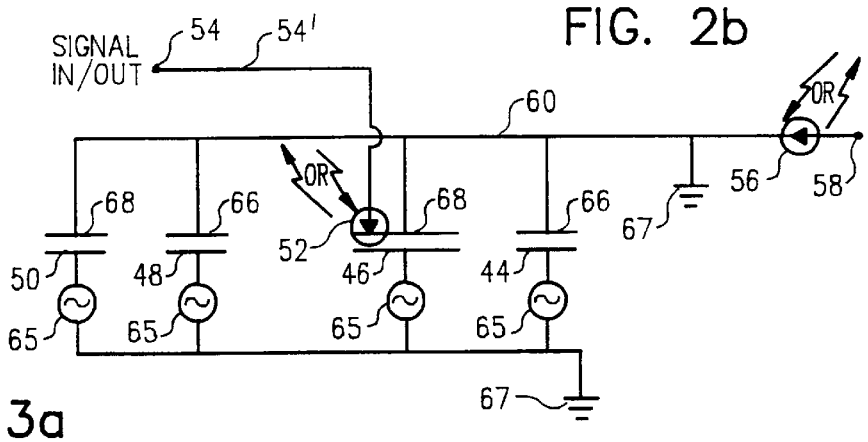
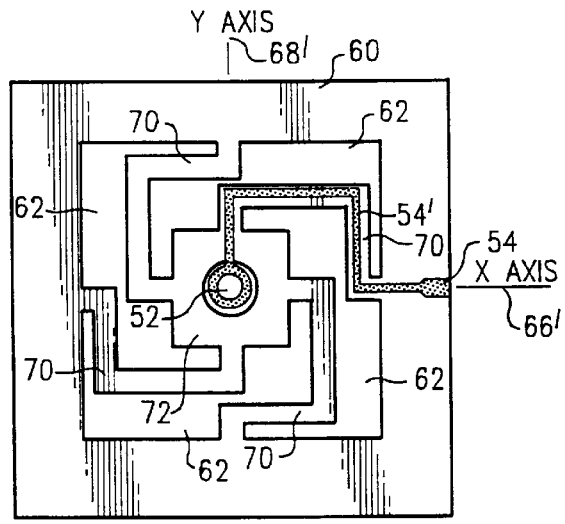
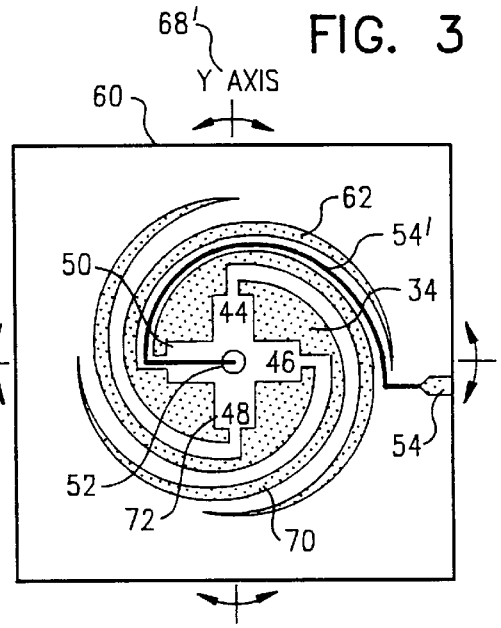
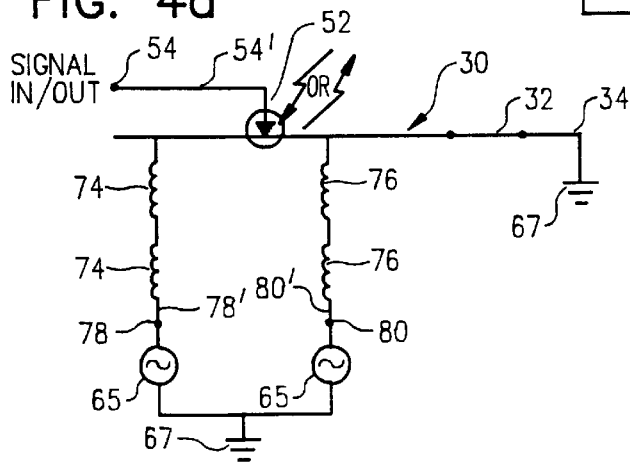

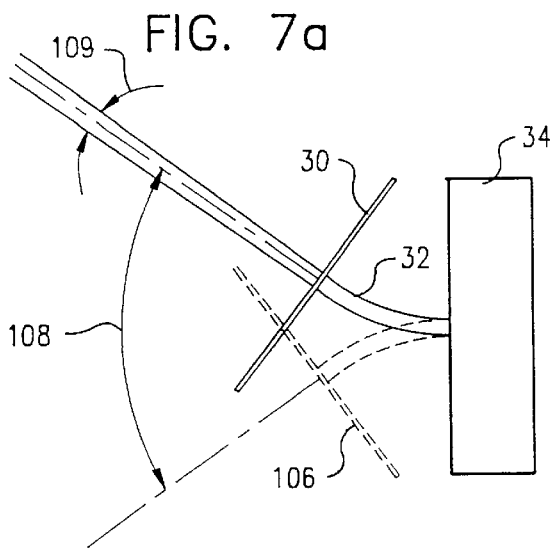
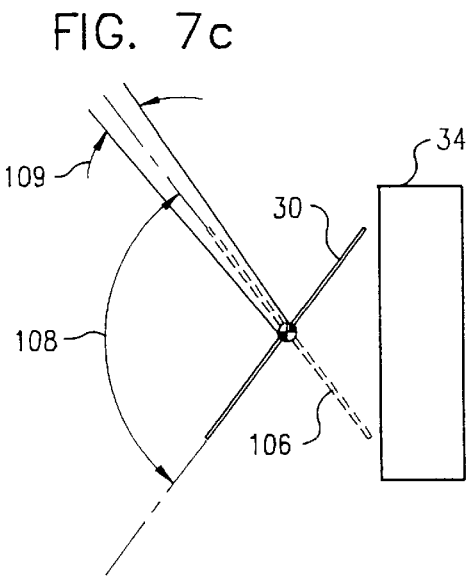
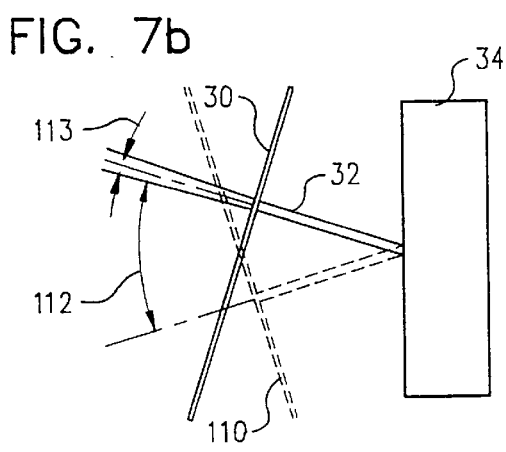
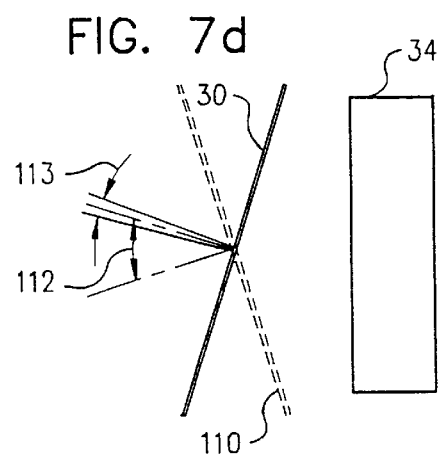
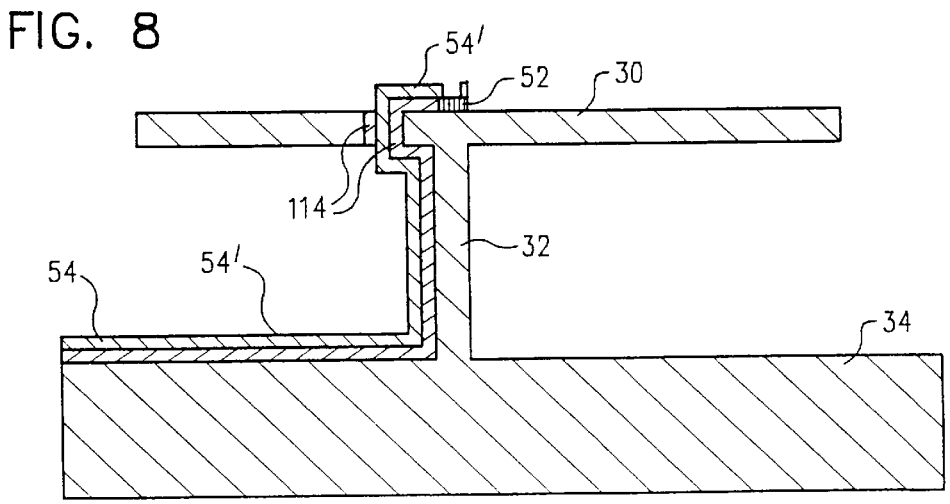

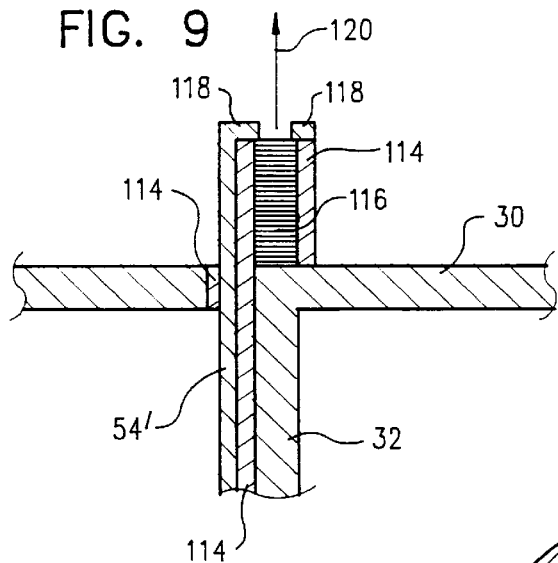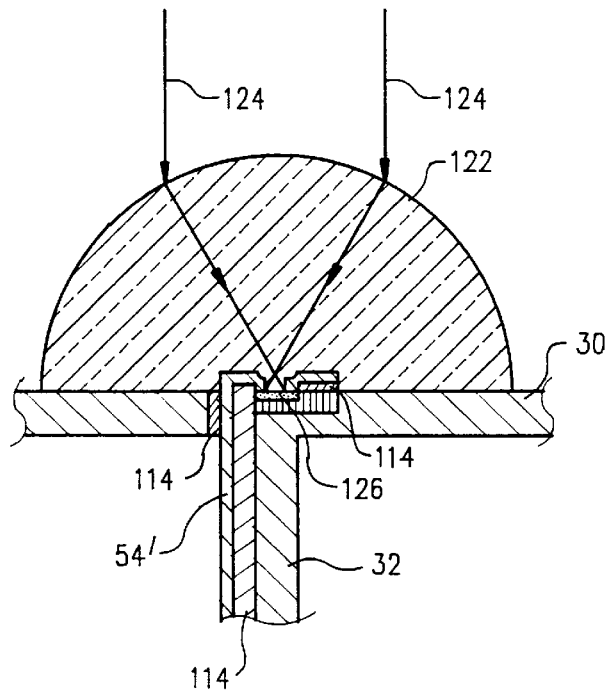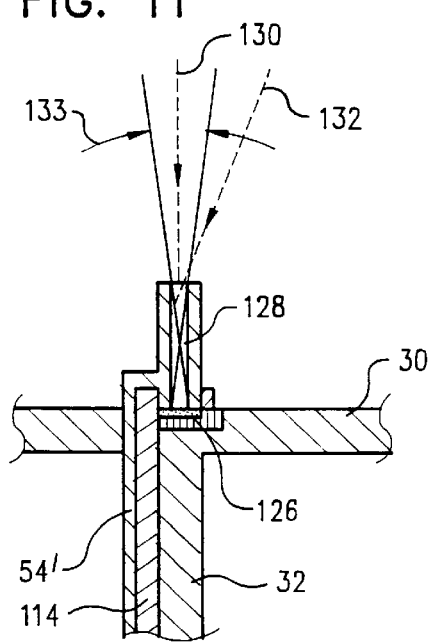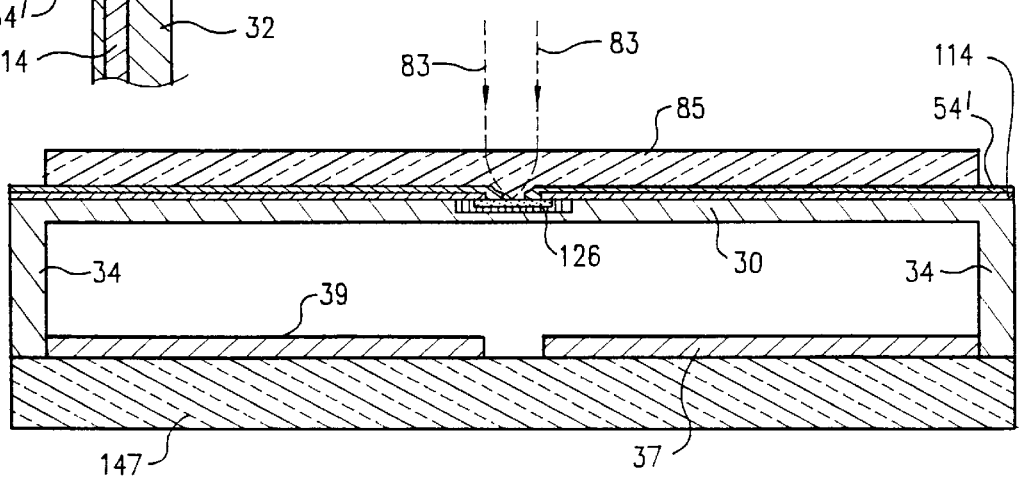

MASK 1

MASK 2

MASK 3

MASK 4

MASK 5

MASK 6

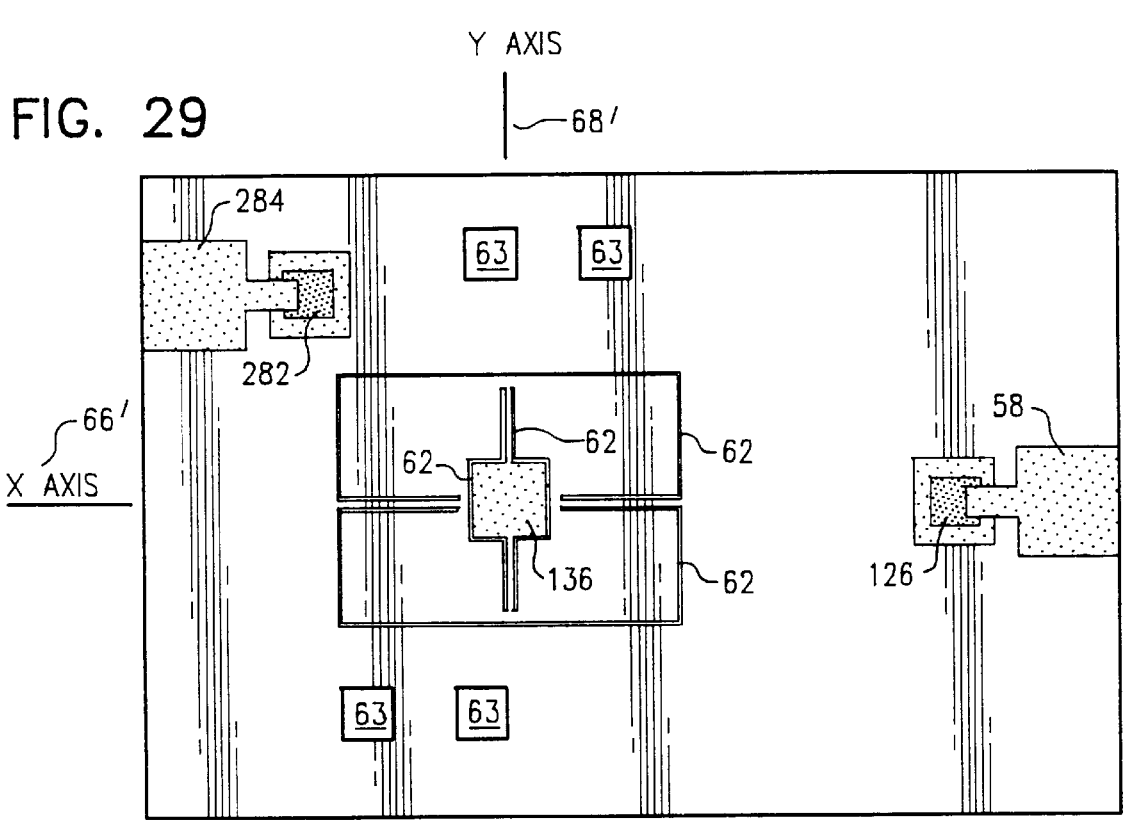

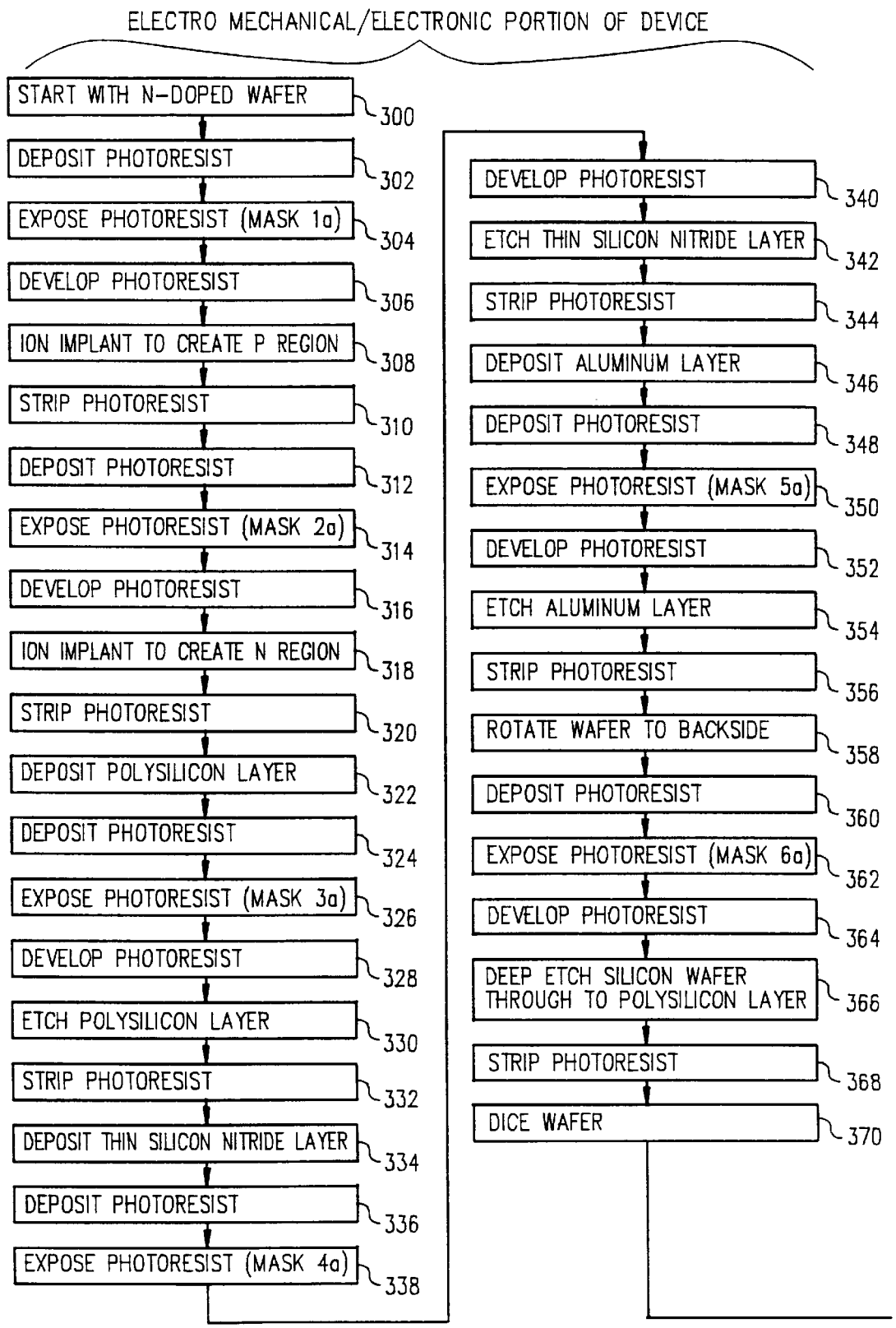
FIG. 30a  MICROFABRICATION STEPS

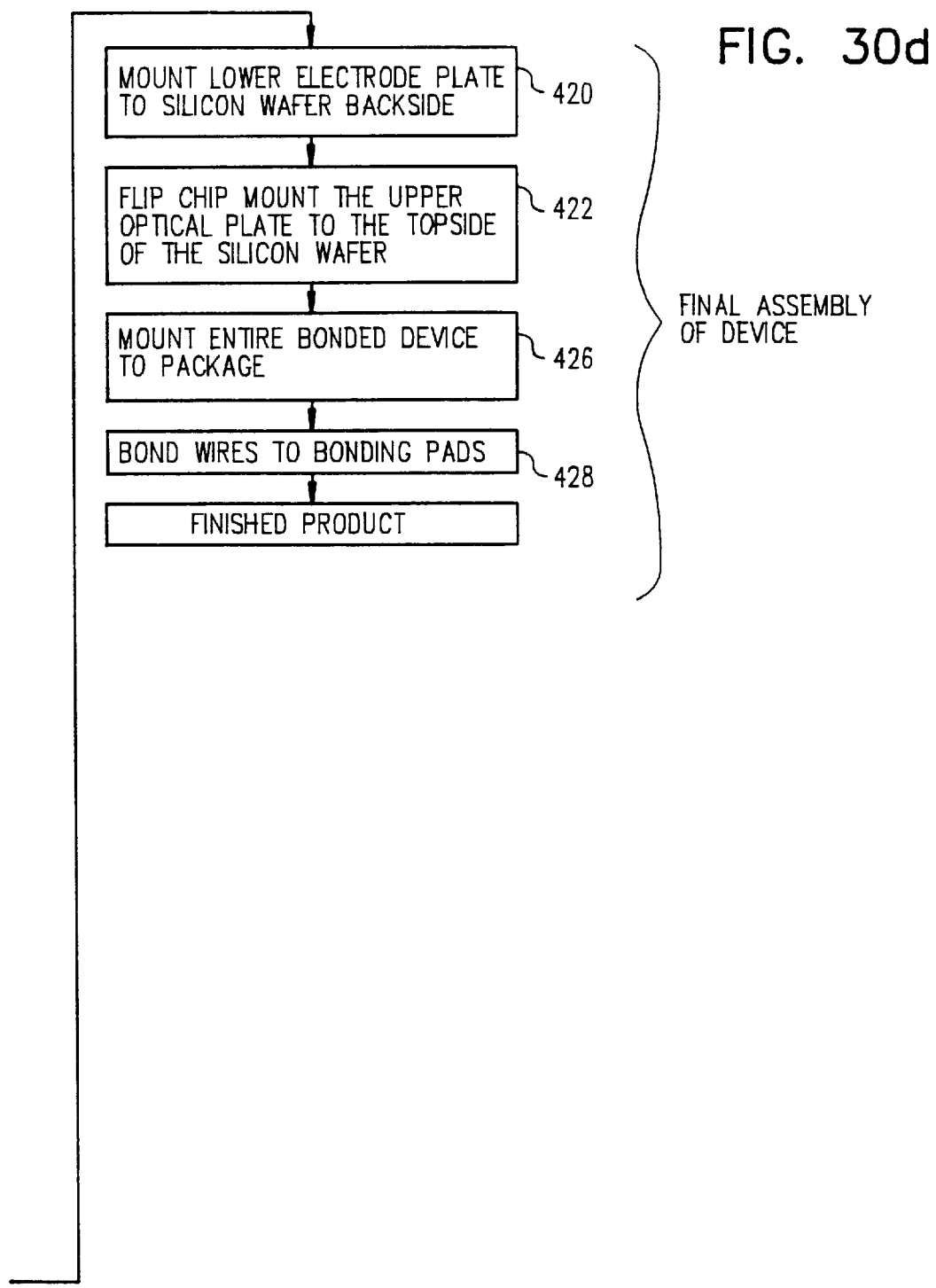

MASK 1a

MASK 2a

FIG. 33    MASK 3a
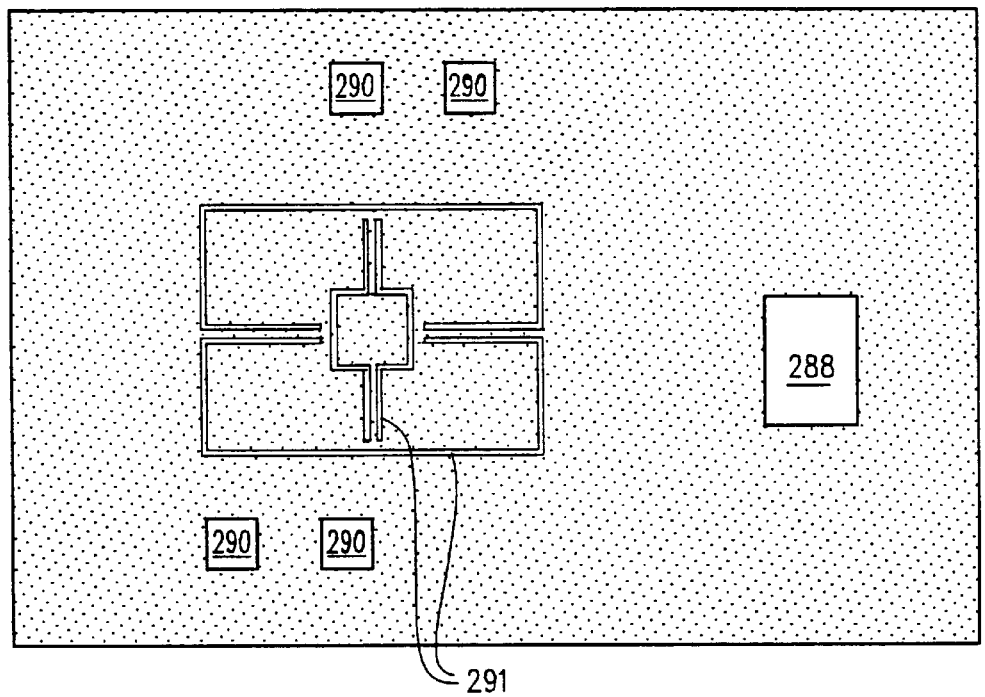
FIG. 34    MASK 4a
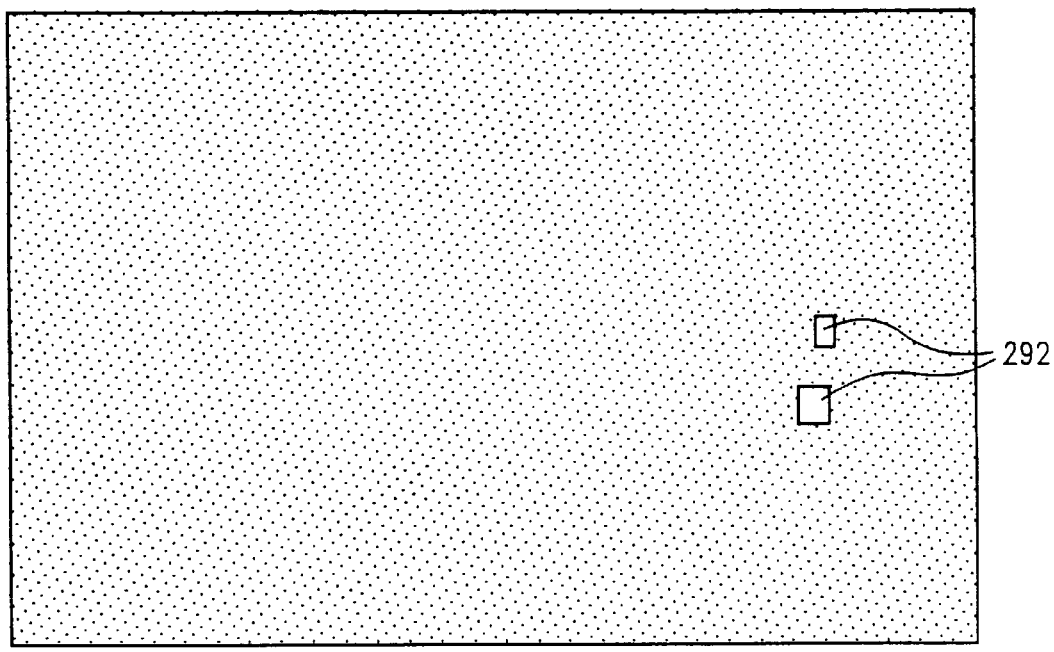

MICROELECTROMECHANICAL
TELEVISION SCANNING DEVICE AND
METHOD FOR MAKING THE SAME

This is the national stage applications of PCT application no. PCT U.S. Ser. No. 94/08165, filed Jul. 19, 1994, which was a continuation-in-part of application Ser. No. 08/093,580, filed Jul. 19, 1993 and now issued as U.S. Pat. No. 5,673,139.

1. Field of the Invention

This invention relates generally to mechanical television scanning mechanisms and more particularly to microelectromechanical television scanning mechanisms fabricated according to the principles used to fabricate monolithic integrated circuits, thus enabling the physical dimensions of the scanning mechanism to be submillimeter in scale.

2. Description of the Prior Art

Typically, prior art mechanical television scanning mechanisms are large, require external light sources or sensors, have limited operating frequencies and geometrical fields of view, and are fragile. Additionally, prior art mechanical scanners generally include many components. Such mechanisms generally require extensive and intricate manufacturing processes, with associated high costs and low reliability.

Therefore, there is a need for a scanning mechanism that is small in size, facilitates integral or other non-integral radiation sources or sensors, has a wide geometrical field of view, high operating frequency and is robust in construction. Of the known mechanical television scanning mechanisms, only the scanner provided by the present invention is fabricated in much the same manner as monolithic integrated circuits, thus enabling the physical dimensions of the device to be exceedingly small.

GOTO, in U.S. Pat. No. 5,097,354, discloses a beam scanner which is an electrostatically actuated, torsionally supported two-dimensional scanning mirror. This scanner is constructed in two components. In addition to its simplicity, the scanner features a torsional mirror mount which limits the range of angular deflection of the mirror. This patent also discloses transducers including a vibrating photoelectric sensor in the focal plane of a Fresnel lens.

PETERSEN, in an article entitled "Silicon Torsional Scanning Mirror", IBM J. Res. Develop., Vol. 24, no. 5, Sep. 1980, discloses a silicon torsional scanning mirror which is electrostatically actuated and torsionally supported on a single scanning axis. The device disclosed is constructed in two components, including a scanning mirror element. The scanning mirror element is fabricated from single crystal silicon, which limits the precision of fabrication due to crystal plane etching.

LIDDIARD, in U.S. Pat. No. 4,708,420, discloses a focal plane scanning device which uses piezoelectric actuators and a mirror rigidly fixed to a central compliant flexure member. This arrangement permits deflection about two axes.

BURKE, in U.S. Pat. No. 4,230,393, discloses a two-axis optical scanner which uses a compliant flexure member. The flexure member is compliant in two axes, with each axis having an associated resonance. The flexure member is excited into oscillation at one end by a mechanical oscillator, and has a scanning mirror located at its other end. The scanning mirror scans in the two axes at the associated resonance frequencies in response to excitation by the mechanical oscillator.

LAKERVELD et al., in U.S. Pat. No. 4,073,567, disclose a pivoting mirror device which is actuated electromagnetically. The device includes an oscillating mirror that is centrally supported by a single point bearing, and the bearing permits the mirror to oscillate about two axes.

Finally, BAKER et. al., in U.S. Pat. No. 3,471,641, disclose a resonant scanning apparatus for deflecting a mirror which uses electromagnetic or piezoelectric actuators. This device includes a mirror rigidly fixed to a central compliant flexure member that is actuated by the actuators to permit deflection about two axes.

SUMMARY OF THE INVENTION

The long-standing but heretofore unfulfilled need for a scanning device having the desirable features of small physical dimensions, integral light or other radiation sources or sensors, a wide geometrical field of view, high operating frequency, robust construction, easy manufacture, low cost and high reliability, is fulfilled by the invention disclosed and described in the detailed description which follows.

According to one aspect, the invention is a scanning device. The scanning device comprises a substrate made from a first material and a flexible joint located above the substrate. The flexible joint is made from a second material. The scanning device further comprises a support attached to the flexible joint. The support is made from a third material. In addition, the scanning device includes an actuator formed on at least one of the substrate, the flexible joint and the support. The actuator is able to cause the support to move relative to the substrate. Further, the scanning device includes an optical element or other energy processing element, such as an optical collimator, on the upper surface of the support. The materials mentioned previously may be the same or any combination of materials required for effective operation of the device.

In one embodiment, the scanning assembly is composed of a cross- (or other) shaped thin film plate of electrically conductive material (e.g., boron-doped polysilicon crystal). This plate is supported, generally centrally over a substrate, by a flexible member made from a material that is similar to the material from which the plate is made. The flexible member terminates at a fixed base, generally on the substrate, which contains four (or any other desired appropriate number) of electrostatic actuator electrodes. This flexible member extends perpendicularly from the center of the cross- (or other) shaped central plate and is of suitable length to permit sufficient angular displacement of the cross- (or other) shaped central plate.

The four (or other desired number) electrostatic electrodes (e.g., of deposited aluminum film) are located on the fixed base, directly below the four arms of the cross- (or other) shaped central plate, and act as electrostatic actuators of the cross- (or other) shaped central plate. Each conductive electrode has slightly smaller dimensions than the corresponding arm of (or is equal in size to) the cross- (or other) shaped central plate. Electrically conductive lines (e.g., made from deposited aluminum film) or junction isolated conductors from the conductive electrodes communicate with pads located on the fixed base. An insulating film (e.g., of silicon dioxide, or, preferably, of silicon nitride is deposited between the conductive plates, the conductive lines and the fixed base. Attraction and repulsion forces are induced between the base and the cross- (or other) shaped central plate when a voltage is applied between the conductive plates and the arms of the moving cross- (or other) shaped central plate. These forces can cause the cross- (or other) shaped central plate to move in directions about two distinct axes. The previously mentioned flexible member contains any number of electrically conductive lines (e.g., made from deposited aluminum film) or junction isolated conductors deposited on its outer surface. These lines communicate between any desired number of light or other radiation sources or sensors located on the top side of the cross- (or other) shaped central plate and the pads located on the fixed base.

A flexible member perpendicular to the fixed base is not the only way to support the moving cross- (or other) shaped central plate. In another embodiment of the invention, suspension of the cross- (or other) shaped central plate is accomplished by a thin film gimbal. In this embodiment a thin planar film of flexible material (e.g., polycrystalline silicon) is supported above the fixed base and perforated in such a manner as to form a gimbal ring supported externally by two thin, torsionally flexible collinear supports. In addition, the cross- (or other) shaped central plate is formed centrally by the perforations. The cross- (or other) shaped central plate is supported by two further thin, torsionally flexible, collinear supports that are positioned orthogonally to the aforementioned two collinear supports. In this manner the central plate is free to be rotated out of the plane of the thin film of flexible material in any desired direction. The cross- (or other) shaped central plate has any desired number of light or other radiation sources or sensors formed on its upper surface, with conductive lines communicating from the light or other radiation sources or sensors to stationary electrodes located on the fixed base. The entire gimbal assembly is suspended above the fixed base, which contains the electrostatic actuator plates.

A further means of suspension of the moving cross- (or other) shaped central plate is by thin film spiral springs. In a preferred embodiment of the invention involving this method, a thin film of flexible material (e.g., polycrystalline silicon) is supported above the fixed base and perforated in such a manner as to form a series of spirals (smooth or rectilinearly discontinuous) communicating from the internal edge of a circular (or rectangular) perforation to the outer edge of the cross- (or other) shaped central plate. In this manner the central plate is free to be rotated out of the plane of the thin film of flexible material in any desired direction. The cross- (or other) shaped central plate has any desired number of light or other radiation sources or sensors formed on its upper surface, with conductive lines communicating from the light or other radiation sources or sensors to stationary electrodes located on the fixed base. The entire spring assembly is suspended above the fixed base, which contains the electrostatic actuator plates. The electrostatic actuators may act in the same manner as in the gimbal plate mentioned above or in the following fashion. The electrostatic actuator base plates are formed of the same shape and are parallel to the spiral springs. When a voltage potential is applied between the base plates and the springs, a continuous force is applied along the entire length of the spring. Since the spring is relatively long, the small force applied over the entire length of the spring induces a relatively large excursion at the point of connection to the central plate.

Actuation of any of the embodiments of the inventive device mentioned above is not necessarily electrostatic. One possible additional way of actuating the embodiment is magnetically. To accomplish this, conductors of deposited aluminum film are shaped to form spiralling coils on the arms of the cross- (or other) shaped central plate. When the inventive device is placed in a magnetic field of proper orientation, current passing through any one of the coils produces a moment which deflects the cross- (or other) shaped member in a known direction. A proper combination of the currents through selected coils can cause the cross- (or other) shaped central plate to deflect in the desired fashion. While operating under the control of magnetic fields generated by coils, the inventive device operates similarly to a moving coil galvanometer, which is known in the prior art.

Still another additional way to actuate the cross- (or other) shaped central plate involves piezoelectric actuators. For piezoelectric action, four small blocks of conventional piezoelectric crystal film (e.g., zinc oxide) are formed, one block directly under each of the arms of the cross- (or other) shaped central plate. The piezoelectric crystal films are individually fixed between the base of the inventive device and the arms of the cross- (or other) shaped central plate. Actuation occurs when current is applied, in the manner known in the prior art, across the piezoelectric crystal films. The piezoelectric crystal films expand or contract in a direction perpendicular to the plane formed by the arms of the cross- (or other) shaped central plate in accordance with the polarity and magnitude of voltage applied. When the motion of the piezoelectric crystal films is properly coordinated, the desired scanning motion of the cross- (or other) shaped central plate is achieved.

Yet another way to actuate the cross-shaped central plate uses forces that are created by thermal stress. By locally heating the member that connects between the base and the cross-shaped central plate (through resistive or optical means), a temperature gradient causes a bending moment in the connecting member. This bending moment causes the connecting member to bend away from the source of heat, much in the same manner as a bimetallic strip bends. By selectively heating different positions on the connecting member, any desired scanning motion of the cross-shaped central plate can be generated.

The transducers located on the top of the cross-shaped central plate and/or on the fixed base can serve a variety of functions regardless of how the cross-shaped central plate is caused to scan. In the case where a laser diode or other collimated radiation emitter is located on the moving cross-shaped central plate and photoreceptors or other radiation detectors (e.g., phototransistor, photodiode, etc.) are located on the fixed base, the inventive device acts as a flying spot scanner. The laser light or other radiation emitted from the laser diode (or other) collimated radiation emitter is scanned by the moving cross-shaped central plate across an object in a raster pattern. The light or other radiation reflected from the object is detected by the stationary photoreceptor radiation detector, which converts the variations of the detected reflected light (or other) radiation into a video signal. Additionally, photoreceptors or other radiation detectors can be collocated on the moving cross-shaped central plate with the laser diode or other collimated radiation emitter, permitting a more compact design.

When the diode laser or other collimated radiation emitter located on the top of the moving cross-shaped central plate is modulated and scanned in accordance with an incoming video signal, it is possible to use the inventive device as a television monitor. The television monitor constructs an image by projecting the modulated collimated laser light or other radiation beam from the scanner onto a translucent or opaque screen.

If a photoreceptor (or other collimated radiation detector) replaces the laser diode (or other collimated radiation emitter) on the moving cross (or other central plate) member, the inventive device can be used as an image dissector. Ambient light (or other radiation) from a self-contained source (such as a laser light emitting diode) can be reflected from the object being imaged and is then detected by the photoreceptor (or other collimated radiation detector) which is scanned across the directions of the image by the moving cross-shaped central plate. Some form of light or other radiation collimator (e.g., a lens, a gradient index lens or tube made of deposited aluminum) can also be located on the moving cross-shaped central plate above the photoreceptor or other radiation detector, thus providing further directional sensitivity to the photoreceptor or other radiation detector. High directional sensitivity of the photoreceptor or other radiation detector can be required in this mode of operation in order to dissect the image by one beamwidth of the laser light beam per scanner pass.

A further embodiment of the inventive device includes a combination of both a laser diode (or other collimated radiation emitter) and collimated photoreceptor (or other radiation detector) on the cross-shaped central plate. This combination of elements permits operation of the inventive device in any of the previously mentioned ways by activation of the laser diode (or other collimated radiation emitter) or photoreceptor (or other collimated radiation detector, or any combination thereof.

Also, if a reflective surface is formed or placed on the top surface of the cross-shaped central plate, a still further embodiment of the inventive device can be used as a reflective flying spot scanning device, with light or other radiation from a stationary light (or other collimated radiation) source (such as a laser diode) reflecting off the surface of the cross-shaped plate as it moves. The emitted, collimated radiation beam is scanned across the imaged object and radiation reflected off the object is detected by a stationary radiation detector.

Additionally, if the reflective surface is formed or placed on the top surface of the central plate, a still further embodiment of the inventive device can be used as a reflective television monitor, with radiation from a stationary modulated collimated radiation source (e.g., a laser diode) reflecting off the surface of the central plate as it moves. The emitted, modulated collimated radiation beam is scanned across a translucent or opaque screen and viewed by an observer.

Further, if incoming radiation from an object is reflected off the surface of the central plate to a collimated radiation detector, the device acts as a reflective image dissector.

Other objects of this invention will become apparent in the detailed description of the preferred embodiment of the invention. The invention comprises the features of construction, combinations of elements and arrangements of parts that will be exemplified in the construction hereinafter set forth, and the scope of the invention will be determined by the claims.

BRIEF DESCRIPTION OF THE DRAWINGS

FIG. 1b is an electrical schematic of the scanning device illustrated in FIG. 1a.

FIG. 2b is an electrical schematic of the scanning device illustrated in FIG. 2.

FIG. 3 is a top view of a third preferred embodiment of the scanning device of the invention, the third embodiment having an alternate spiral spring moving plate suspension.

FIG. 3a is a revision of the third embodiment of the invention.

FIG. 4a is an electrical schematic of the scanning device illustrated in FIG. 4.

FIG. 7a illustrates a high amplitude action of the moving plate about a single axis.

FIG. 7b illustrates a low amplitude action of the moving plate about a single axis.

FIG. 7c illustrates a high amplitude action of the moving plate on a gimbal mount.

FIG. 7d illustrates a low amplitude action of the moving plate on a gimbal mount.

FIG. 8 is a detailed view of the electrical communication between a photoelectric device and a conductive line on a preferred embodiment of the invention.

FIG. 9 is a detailed view of a scanning radiation emitter configuration in accordance with the present invention.

FIG. 10 is a detailed view of an optically collimated radiation detector configuration in accordance with the present invention.

FIG. 11 is a detailed view of a tube-collimated radiation detector configuration in accordance with the present invention.

FIG. 11a is a detailed view of a combination laser and gradient index lens collimated photoreceptor or detector for other radiation in accordance with the present invention.

FIG. 14a is an electrical schematic of the scanning device illustrated in FIG. 14a.

FIG. 29 is a top view of a thin film of the invention.

FIGS. 30, 30a, 30b, 30c, and 30d are a flow chart of an exemplary process for producing the another illustrated embodiment of the present invention.

FIG. 33 is a third mask for use with the flow chart of FIGS. 30a–d.

FIG. 34 is a fourth mask for use with the flow chart of FIGS. 30a–d.

DETAILED DESCRIPTION OF THE PREFERRED EMBODIMENT

Figure 1:
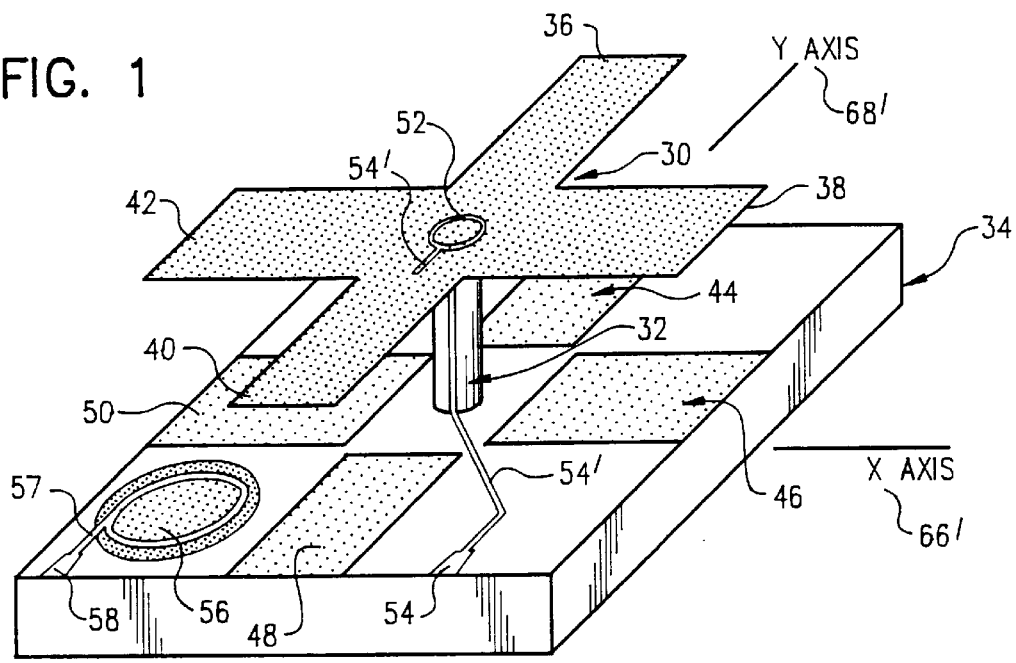

FIG. 1 is an orthogonal view of a first preferred embodiment of the microelectromechanical television scanning device according to the invention, the first preferred embodiment having a suspended cross- (or other) shaped central plate. The scanning cross-shaped central plate 30 (e.g., made from a material such as deposited n-doped polysilicon) is affixed to a flexible shaft 32 preferably made from the same material as, and in electrical communication with, the scanning cross-shaped central plate 30. The flexible shaft 32 is anchored to a fixed base 34, preferably made of the same material as, and in electrical communication with, the flexible shaft 32. The scanning cross-shaped central plate 30 has arms denoted by reference numerals 36, 38, 40 and 42. The fixed base 34 has electrodes 44, 46, 48 and 50 (e.g., made of deposited aluminum film) formed thereon. The electrodes 44, 46, 48 and 50 respectively attract or repel the moving cross arms 36, 38, 40 and 42, depending upon the voltage applied to them. A photoelectric device 52 (e.g., a laser diode (or other collimated radiation emitter) or collimated photoreceptor (or other radiation detector) is located on the top of the scanning cross-shaped central plate 30. Electrical communication with the photoelectric device 52 is accomplished through a conductive line 54' (e.g., made of deposited aluminum film) and an electrode 54 preferably made from the same material as the conductive line 54'. Another photoreceptor radiation detector or photoemitter 56 may be located on the fixed base 34, with electrical communication established by a conducting line 57 (or junction isolated conductor, e.g., made of deposited aluminum film and an electrode 58 made from the same material or junction isolated conductor).

Figure 1A:
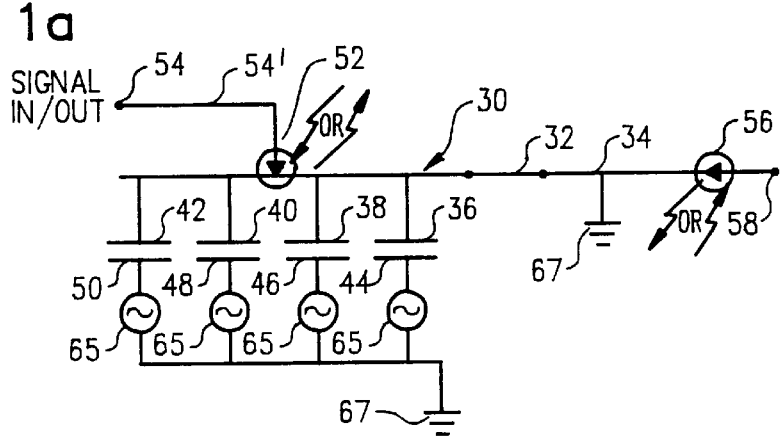
FIG. 1a is an orthogonal view of a first preferred embodiment of the microelectromechanical television scanning device according to the invention, the first preferred embodiment having a central plate suspended cross-shaped plate on a flexible member.
Figure 30:
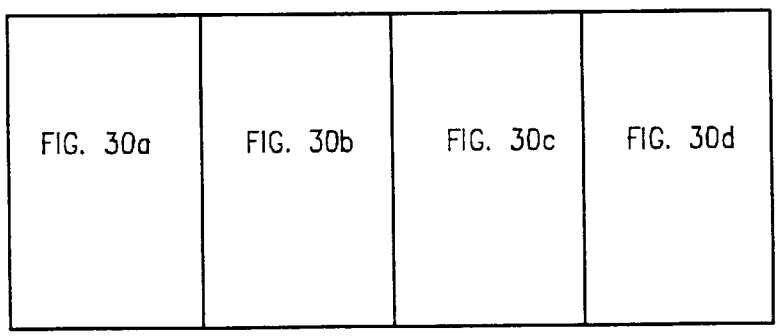

FIG. 1a is an electrical schematic of the scanning device illustrated in FIG. 1. Each schematic symbol represents the corresponding element with the same number as in FIG. 1. Feedback controlled oscillators 65 drive the electrostatic actuator pairs 36 and 44, 38 and 46, 40 and 48, and 42 and 50. A common ground 67 completes the device circuit. Devices 52 and 56 are either radiation emitters or radiation detectors.

Figure 2:
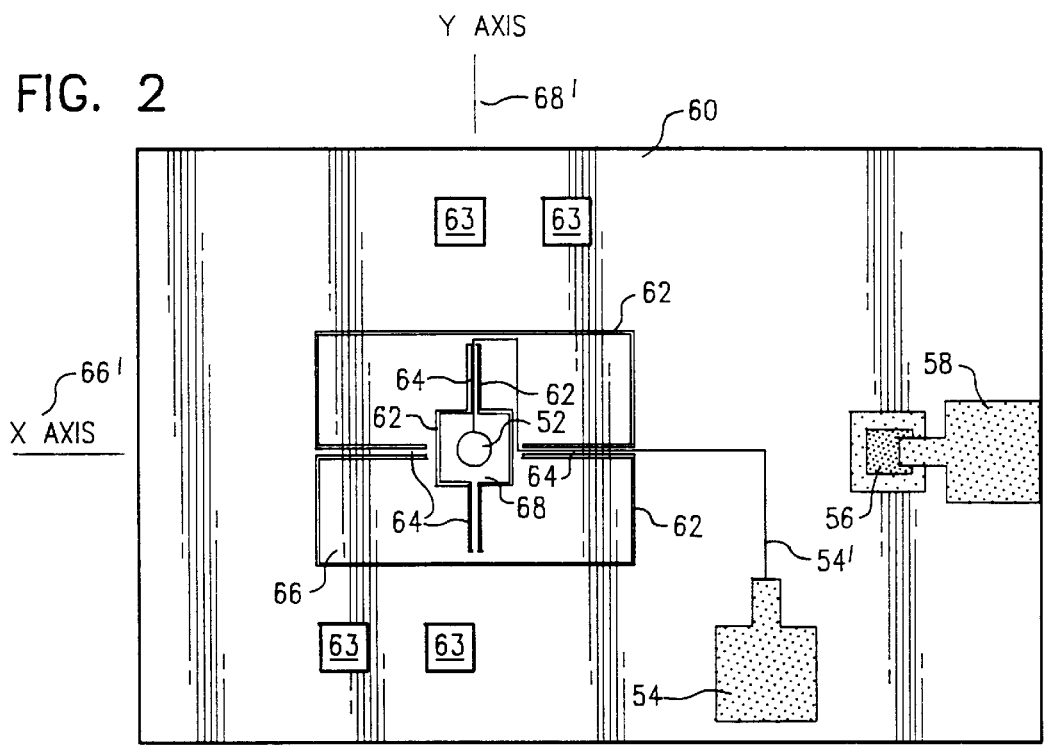
FIG. 2 is a top view of a second preferred embodiment of the scanning device of the invention, the second embodiment having a gimbaled moving plate suspension.
Figure 2A:
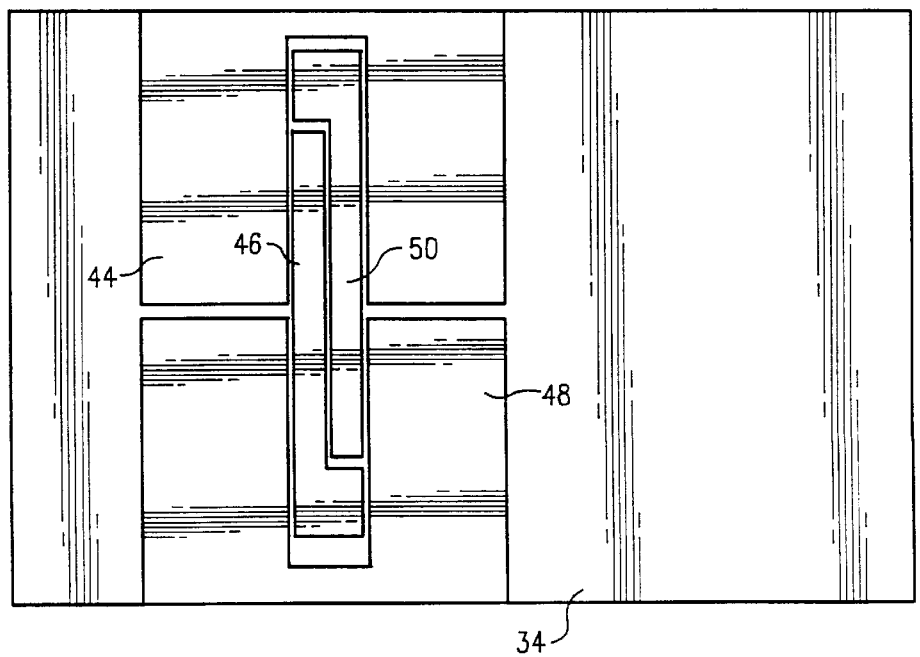
FIG. 2a is a top view of the actuator electrodes for the scanning device illustrated in FIG. 2.

FIGS. 2 and 2a are top views of a second preferred embodiment of the scanning device of the invention, the second embodiment having a gimbaled moving plate suspension. A thin film 60 of a flexible material (e.g., deposited n-doped polysilicon) is located above the fixed base 34, with the electrodes 44, 46, 48 and 50 being formed on the fixed base 34. The thin film 60 is perforated by perforations 62 in a manner that forms small torsionally flexible regions 64. Additionally, a gimbal ring 66 and a central gimbal plate 68 is formed by the perforations 62. The gimbal ring 66 is free to rotate about the x-axis 66', and the central gimbal plate 68 is free to rotate about the y-axis 68'. Electrical communication between the outside electrode 54 and the photoelectric device 52 is established by the conducting line 54'. Through holes 63 are cut in the thin film 60 to provide access to electrodes 44, 46, 48 and 50. The features shown in FIG. 2 are suspended above the items in FIG. 2a with sufficient spacing between them to permit free out-of-plane rotation of the gimbal ring 66 and the central plate 68. As with the device illustrated in FIG. 1, a stationary radiation detector 56 may be located on the flexible film 60 with an associated electrode 58.

Other alternative forms of gimballing mechanisms are also possible. In particular, it is possible to form a gimbal device having hemispheric cylindrical bearings which are formed to create low-friction rolling-contact with a base plate. Such alternative forms of gimballing bearing mechanisms or other mechanisms which allow a plate such as plate 60 to freely respond to forces such as those produced by the electromagnetic and other mechanisms described herein, are considered to be encompassed by the present patent specification.

FIG. 2b is an electrical schematic of the scanning device illustrated in FIGS. 2 and 2a. Each schematic symbol represents the corresponding element with the same number as in FIGS. 2 and 2a. Feedback controlled oscillators 65 drive the electrostatic actuator pairs 36 and 44, 38 and 46, 40 and 48, and 42 and 50. A common ground 67 completes the device circuit. Devices 52 and 56 are either radiation emitters or radiation detectors.

FIG. 3 is a top view of a third preferred embodiment of the scanning device of the invention, the third embodiment having an alternate spiral spring moving plate suspension, and FIG. 3a is a revision of the third embodiment. The thin film 60 of the flexible material is located above the fixed base 34, with the electrodes 44, 46, 48 and 50 being formed on the fixed base 34, in the area covered by a central plate 72. The thin film 60 is perforated by the perforations 62 in a manner that forms long, thin linear springs 70. Additionally, the modified scanning cross-shaped central plate 72 is formed by perforations 62. The scanning cross-shaped central plate 72 is free to rotate about the x- or y-axis 68' and 64', respectively). Electrical communication between the electrode 54 and the photoelectric device 52 is established by the conducting line 54'. When a voltage potential is applied between the lower electrodes 44, 46, 48 and 50 and springs 70, a continuous force is applied along the entire length of the spiral springs 70. Since each spiral spring 70 is relatively long, the small force applied along the entire length of the spring 70 induces a relatively large excursion at the point of connection to the plate 72.

Figure 4:
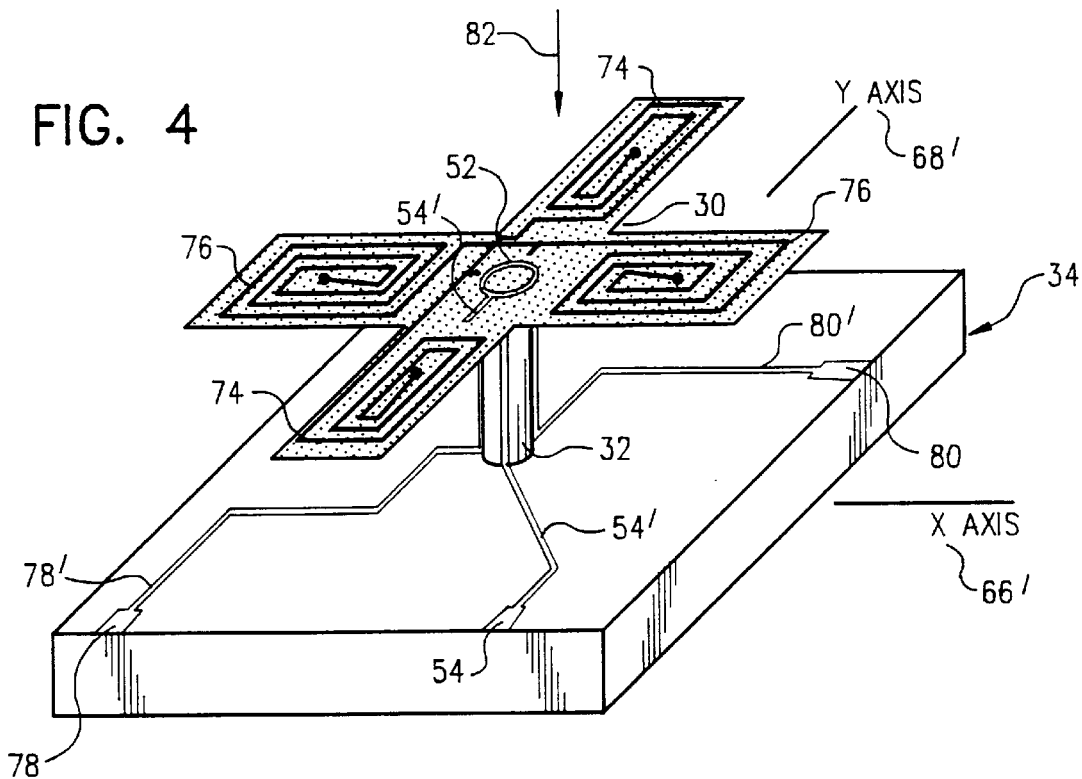
FIG. 4 is an orthogonal view of a fourth preferred embodiment of the scanning device of the invention, the fourth embodiment having a magnetically actuated configuration.

FIG. 4 is an orthogonal view of a fourth preferred embodiment of the scanning device of the invention, the fourth embodiment having a magnetically actuated configuration. The scanning cross-shaped central plate 30 includes a set of electrically conductive coils 74 and 76 (e.g., made of deposited aluminum film) formed on its upper surface. Electrodes 78 and 80 electrically communicate with the coils 74 and 76, respectively, through electrically conductive traces. When the scanning cross-shaped central plate 30 is positioned in a magnetic field 82 and electric current is modulated in the proper fashion in the coils 74 and 76, the scanning cross-shaped central plate 30 will scan in any desired motion.

FIG. 4a is an electrical schematic of the scanning device illustrated in FIG. 4. Each schematic symbol represents the corresponding element with the same number as in FIG. 4. Feedback controlled oscillators 65 drive the moving magnetic coils 74 and 76. A common ground 67 completes the device circuit. Device 52 is either a radiation emitter or radiation detector.

Figure 5:
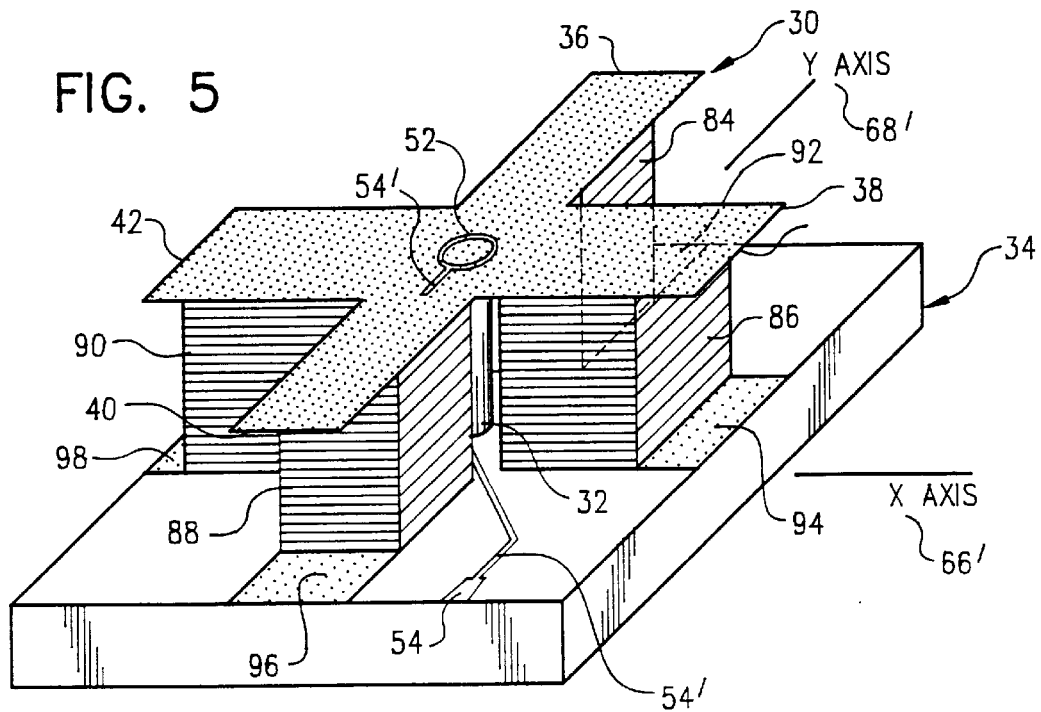
FIG. 5 is an orthogonal view of a fifth preferred embodiment of the scanning device of the invention, the fifth embodiment having a piezoelectrically actuated configuration.

FIG. 5 is an orthogonal view of a fifth preferred embodiment of the scanning device of the invention, the fifth embodiment having a piezoelectrically actuated configuration. The piezoelectric crystals 84, 86, 88 and 90 (e.g., made of deposited zinc oxide film) are formed on the fixed base 34, and support the scanning cross-shaped central plate 30. Electrical communication is established between the electrodes 92, 94, 96 and 98 (e.g., made of deposited aluminum film), through the piezoelectric crystals 84, 86, 88 and 90, respectively, to the moving cross arms 36, 38, 40 and 42, respectively, and down through the flexible shaft 32. The electrodes 92, 94, 96 and 98 are electrically isolated from the fixed base 34.

Figure 5A:
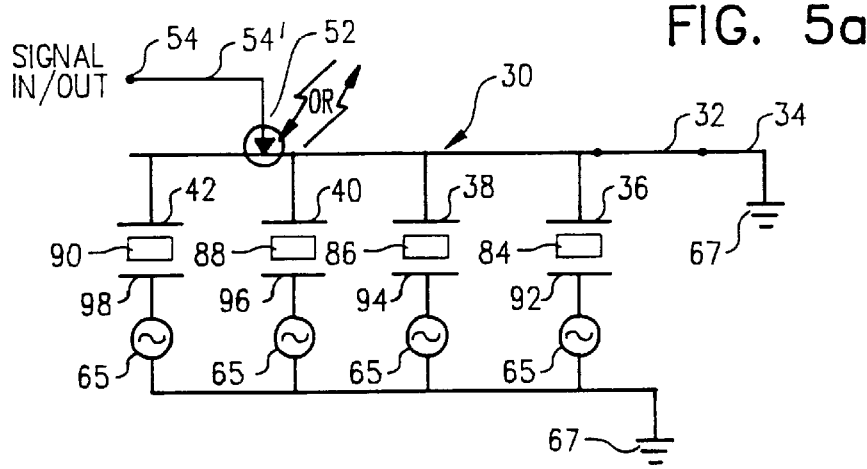
FIG. 5a is an electrical schematic of the scanning device illustrated in FIG. 5.

FIG. 5a is an electrical schematic of the scanning device illustrated in FIG. 5. Each schematic symbol represents the corresponding element as numbered in FIG. 5. Feedback controlled oscillators 65 drive the piezoelectric actuator sets 36, 84 and 92; 38, 86 and 94; 40, 88 and 96; and 42, 90, and 98. A common ground 67 completes the device circuit. Device 52 is either a radiation emitter or radiation detector.

Figure 6:
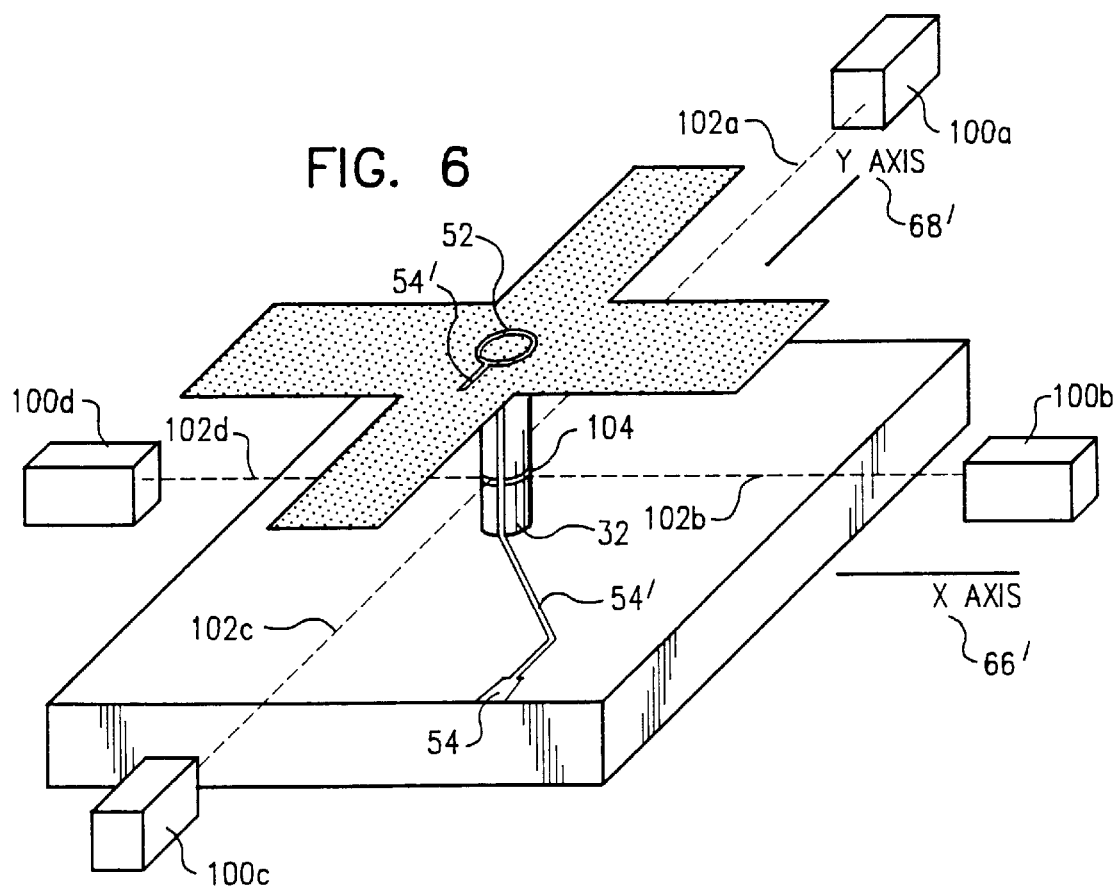
FIG. 6 is an orthogonal view of a sixth preferred embodiment of the scanning device of the invention, the sixth embodiment having a thermally actuated configuration.

FIG. 6 is an orthogonal view of a sixth preferred embodiment of the scanning device of the invention, the sixth embodiment having a thermally actuated configuration. The thermal lasers 100a–d emit corresponding light or other radiation beams 102a–d containing light or other radiation at a suitable wavelength, to heat the flexible shaft 32 at corresponding portions of an area 104. After the area 104 of the flexible shaft 32 is heated by the light or other radiation beam or beams selected from the set of beams 102a–d, the flexible shaft 32 bends away from the direction of the source of the heat, in this case away from the direction of the selected radiation beams 102a–d. By appropriately varying the heating and cooling of the area 104 by means of the lasers 100a–d, the scanning cross-shaped central plate 30 will scan in the desired direction.

Figure 6A:
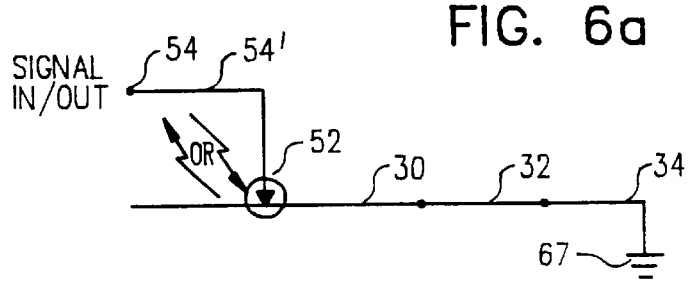
FIG. 6a is an electrical schematic of the scanning device illustrated in FIG. 6.

FIG. 6a is an electrical schematic of the scanning device illustrated in FIG. 6. Each schematic symbol represents the corresponding element as numbered in FIG. 6. A common ground 67 completes the device circuit. Device 52 is either a radiation emitter or radiation detector.

Two versions of the scanning mechanism are illustrated as represented by FIG. 1 and by FIGS. 2 and 2a.

FIG. 7a illustrates a high amplitude action of the moving plate, on a flexible shaft 32, about a single axis. The phantom view of the moving cross-shaped central plate 106 illustrates one extreme of excursion (showing the bent flexible shaft 32), while the solid view of the scanning cross-shaped central plate 30 illustrates the other extreme of excursion. The angle of view 108 experienced by the scanning cross-shaped central plate 30 in this situation is wide compared to the field of acceptance 109 that would pertain if the central plate 30 were equipped with a collimator.

FIG. 7b illustrates a low amplitude action of the moving plate, on a flexible shaft, about a single axis. The phantom view of the scanning cross-shaped central plate 110 illustrates one extreme of excursion, while the solid view of the scanning cross-shaped central plate 30 illustrates the other extreme of excursion. The angle of view 112 experienced by the scanning cross-shaped central plate 30 in this situation is narrow, but is still somewhat large compared to the field of acceptance 113 that would pertain if the central plate 30 were equipped with a collimator.

FIG. 7c illustrates a high amplitude action of the moving plate, on a gimbal mount supporting the gimbal plate 68. The phantom view of the moving gimbal plate 68 illustrates one extreme of excursion, while the solid view of the scanning gimbal plate 68 illustrates the other extreme of excursion. The angle of view 108 experienced by the scanning cross-shaped central plate 68 in this situation is wide compared to the field of acceptance 109 that would pertain if the central plate 68 were equipped with a collimator.

FIG. 7d illustrates a low amplitude action of the moving plate 68, on a gimbal mount, about a single axis. The phantom view of the scanning central gimbal plate 68 illustrates one extreme of excursion, while the solid view of the scanning gimbal plate 68 illustrates the other extreme of excursion. The angle of view 112 experienced by the scanning cross-shaped central plate 68 in this situation is narrow, but is still somewhat large compared to the field of acceptance 113 that would pertain if the gimbal plate 68 were equipped with a collimator.

From FIGS. 7a–d, it is readily apparent that increasing the amplitudes of the signals input to the actuating components increases the angle of view of the scanner. Thus, the angle of view of the scanner is easily and readily changed at will by changing the signals to the scanning mechanism. This produces the effect of a varying focal length lens (i.e., zoom lens) without the associated complicated optics. Provision must be made, however, to reduce the instantaneous field of view of the collimator when reducing the overall field of view and vice versa.

FIG. 8 is a detailed view of the electrical communication between a photoelectric device and a conductive line on a preferred embodiment of the invention. It illustrates the electrical communication between the photoelectric device 52 and electrode 54 through the conductive line 54'. An insulative material 114 (e.g., made of deposited silicon oxide (or preferably, silicon nitride film) electrically isolates the conductive line 54' from the scanning cross-shaped central plate 30, the fixed base 34 and flexible shaft 32.

FIG. 9 is a detailed view of a scanning laser configuration in accordance with the present invention. The bottom of a stacked diode laser 116 is in electrical communication with the scanning cross-shaped central plate 30 and the flexible shaft 32. A conductive ring 118 electrically communicates with the top layer of the stacked diode laser 116 and the conductive line 54'. The insulative material 114 serves as both a mechanical support for the conductive ring 118 and an electrical insulator for the conductive ring 118 and the conductive line 54'. The stacked diode laser 116 produces a light or other collimated radiation beam 120.

FIG. 10 is a detailed view of an optically collimated photoreceptor or other radiation detector configuration in accordance with the present invention. A lens 122, made of transparent material (e.g., made of deposited silicon oxide), focuses incoming light or other radiation rays 124 onto a photosensitive semiconductor junction 126 (e.g., made of p-doped silicon). The conductive line 54' and the insulative material 114 serve the same function as in FIG. 8.

FIG. 11 is a detailed view of a tube-collimated photoreceptor or other radiation detector configuration in accordance with the present invention. A tube 128, made of an electrically conductive material (e.g., made of deposited aluminum), passes an incoming incident light or other radiation ray 130 onto a photosensitive semiconductor junction 126. The tube 128 simultaneously prevents any off-axis light or ray 132 or radiation from reaching the photosensitive semiconductor junction 126. The tube 128 has a field of view defined by angle 133. The tube 128 is electrically isolated from the scanning cross-shaped central plate 30 and the flexible shaft 32, but is in electrical communication with the photosensitive semiconductor junction 126 and the conductive line 54'. The conductive line 54' and the insulative material 114 serve the same functions as they serve in FIG. 8.

FIG. 11a is a detailed view of a combination laser and gradient index lens collimated photoreceptor or detector for other radiation in accordance with the present invention. The gradient index refractive element 85 is located above the radiation detector 126. The gradient index refractive element 85 performs a similar function to that performed by the lens 122 in FIG. 10. Light rays 83 are collimated and directed to the radiation detector 81. A gradient index refractive element is a very selective collimator which operates with only a relatively small distance between its front surface and the radiation detector 126. FIG. 11a is also a side view of the configuration illustrated in FIGS. 2 and 2a. The electrode base 147 corresponds to 34 in FIG. 2a.

Figure 12:
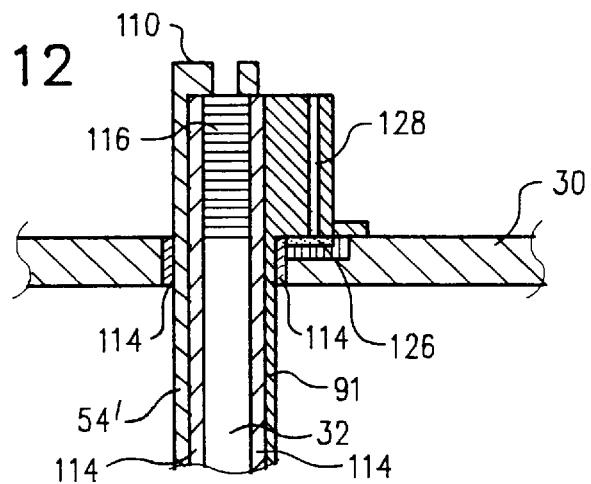
FIG. 12 is a detailed view of a gradient index lens collimated radiation detector configuration in accordance with the present invention.

FIG. 12 is a detailed view of a moving reflector equipped with a combination collimated radiation emitter and a collimated radiation detector configuration in accordance with the present invention. The stacked diode laser 116 functions as it does in FIG. 9, and the tube-collimated radiation detector 126 functions as in FIG. 11. An additional conductive line 91 is required for electrical communication of the photosensitive semiconductor junction 126 with an external electrode.

Figure 13:
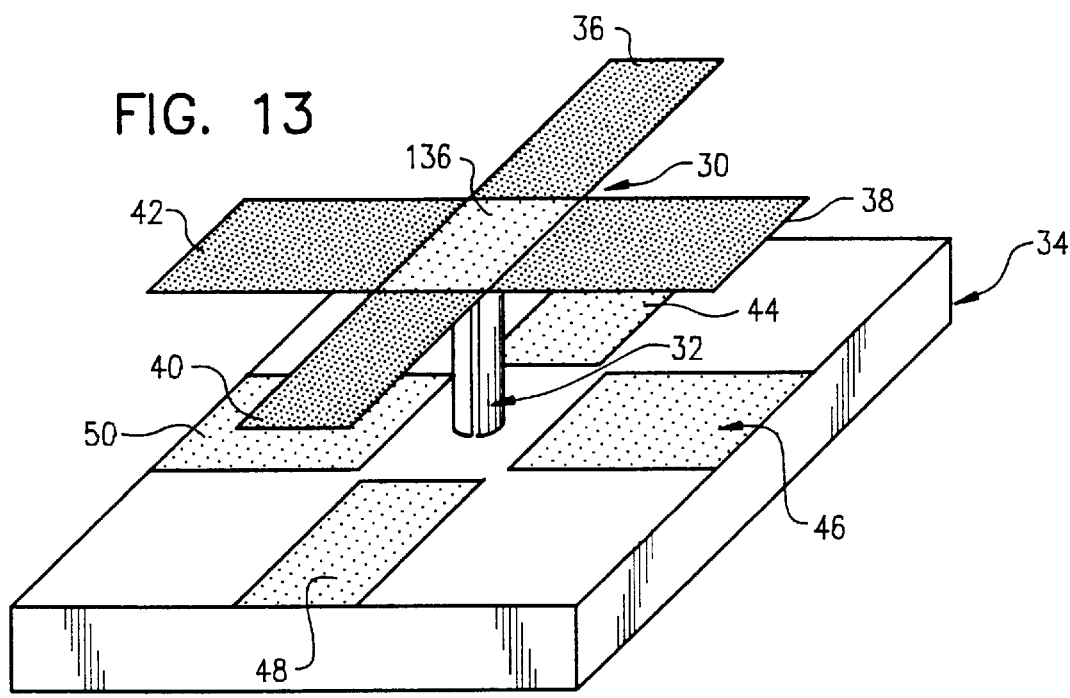
FIG. 13 is a detailed view of a collimated radiation emitter and collimated radiation detector configuration in accordance with the present invention.

FIG. 13 is a detailed view of a moving reflector configuration in accordance with the present invention. The device is actuated in the same manner as described in FIG. 1 except that a reflector 136 (e.g., made of deposited aluminum film) is substituted for the photoelectric device 52.

Figure 13A:
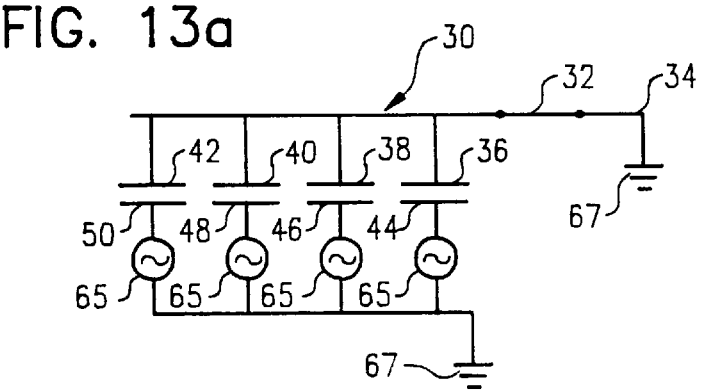
FIG. 13a is an electrical schematic of the device of FIG. 13.

FIG. 13a is an electrical schematic of the scanning device illustrated in FIG. 13. Each schematic symbol represents the corresponding element with the same number as in FIG. 13. Feedback controlled oscillators 65 drive the electrostatic actuator pairs 36 and 44, 38 and 46, 40 and 48, and 42 and 50. A common ground 67 completes the device circuit.

Figure 14:
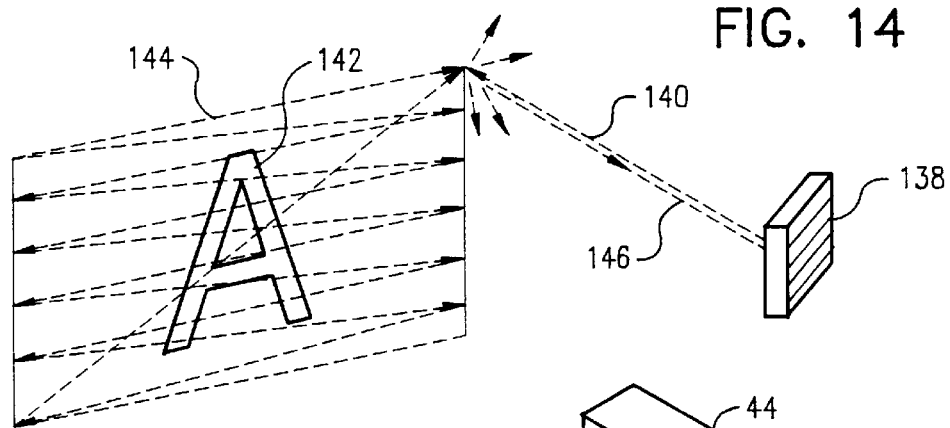
FIG. 14 is an orthogonal view of a seventh preferred embodiment of the scanning device of the invention, the seventh embodiment having a reflective central plate.

FIG. 14 illustrates the action of an embodiment of the present invention in use as a flying spot scanner. The scanner 138 is in the configuration detailed in FIG. 9 with the photoreceptor 56 located on the fixed base 34. A light beam 140 emitted from the stacked diode laser 116 (See FIG. 9) is scanned across an object 142 in a motion pattern such as the raster-scan motion indicated by the reference numeral 144. Any light in the light beam 146 that is reflected from the object 142 is detected by the photoreceptor 56 located on the fixed base 34.

Figure 14A:
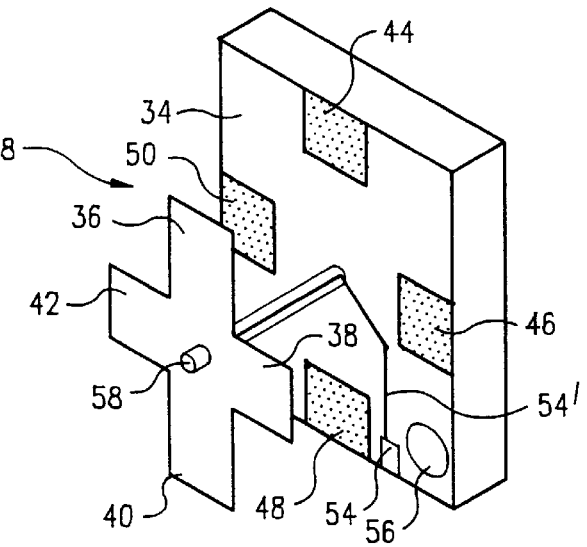

FIG. 14a is an orthogonal view of the scanner 138. The components are substantially identical to the first preferred embodiment shown in FIG. 14, and the corresponding parts have corresponding reference numerals.

Figure 15:
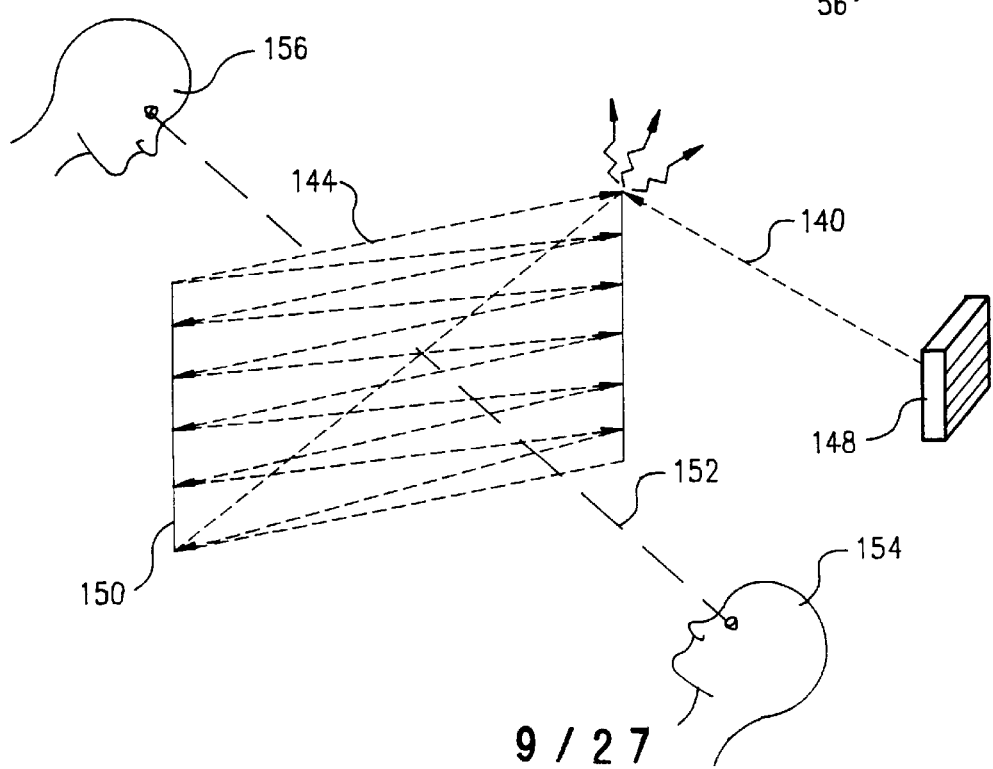
FIG. 15 illustrates the action of an embodiment of the present invention in use as a television monitor.

FIG. 15 illustrates the action of an embodiment of the present invention in use as a television monitor. The scanner 148 is in the configuration detailed in FIG. 9. A light beam 140 emitted from the stacked diode laser 116 is scanned across an opaque screen 150 in a motion pattern such as the raster scan motion indicated by the reference numeral 144. Any light in the light beam 152 that is reflected from the opaque screen 150 can be observed by an observer 154 located in front of the opaque screen 150. If the opaque screen 150 is translucent, the image produced on the opaque screen 150 can be observed by an observer 156 located behind the opaque screen 150.

Figure 16:
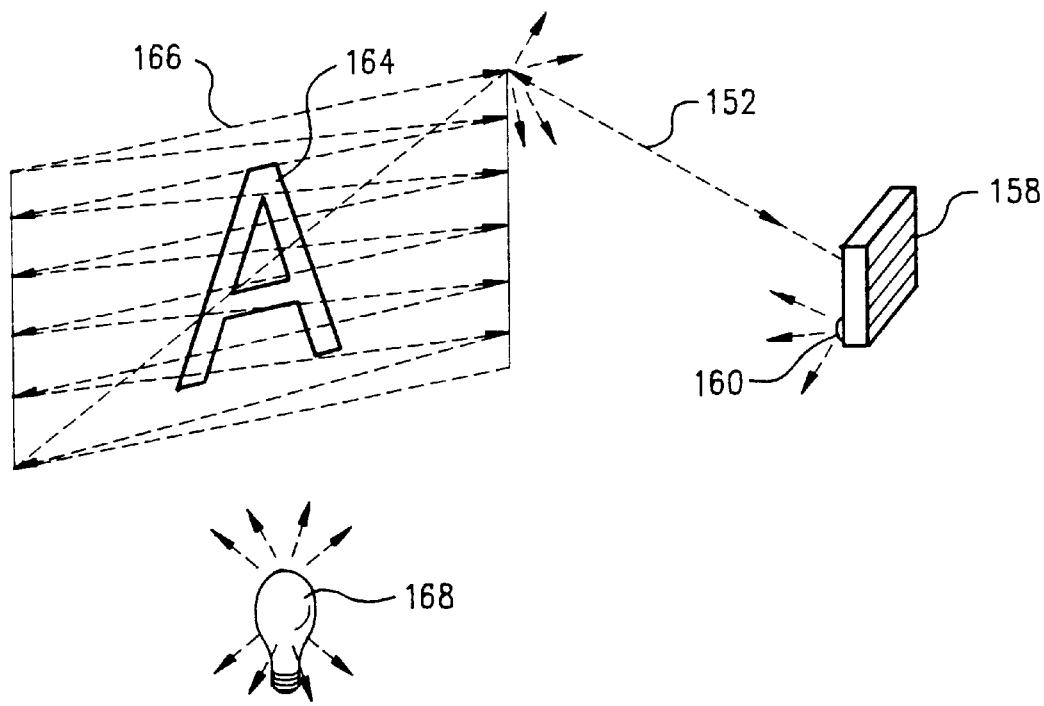
FIG. 16 illustrates the action of an embodiment of the present invention in use as an image dissector.

FIG. 16 illustrates the action of an embodiment of the present invention in use as an image dissector. A scanner 158 is in the configuration detailed in FIG. 10 or FIG. 11 with a photoemitter 56 located on the fixed base 34. A beam 152 of ambient light reflected off an image field 164 is detected by the collimated photoreceptor 126 (See FIGS. 10 or 11). The collimated photoreceptor 126 is scanned across the image field 164 in a motion pattern such the raster scan motion indicated by the reference numeral 166. The beam 152 of ambient light is supplied by either an external source 168 or a self contained photoemitter 160 located on the fixed base 34 of the scanner 158.

Figure 16A:
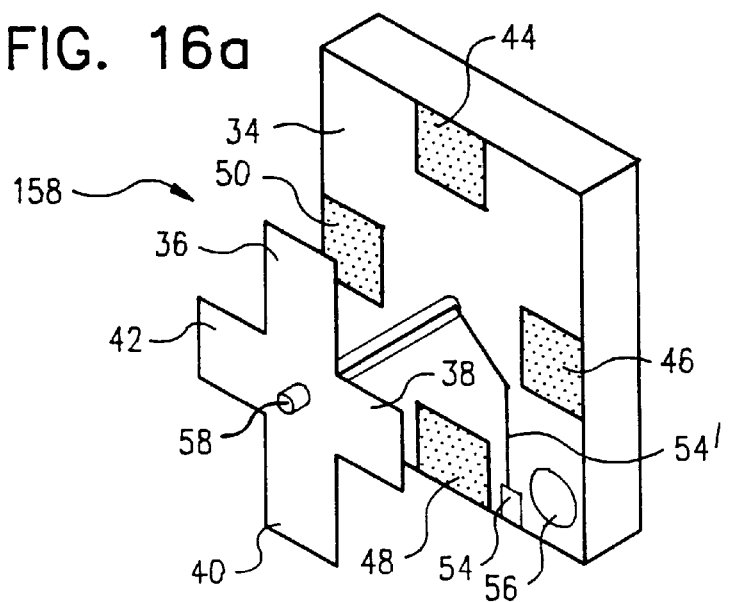
FIG. 16a is an orthogonal view of the scanner 158.

FIG. 16a is an orthogonal view of the scanner 158. The components are substantially identical to the first preferred embodiment shown in FIG. 16, and the corresponding parts have corresponding reference numerals.

Figure 17:
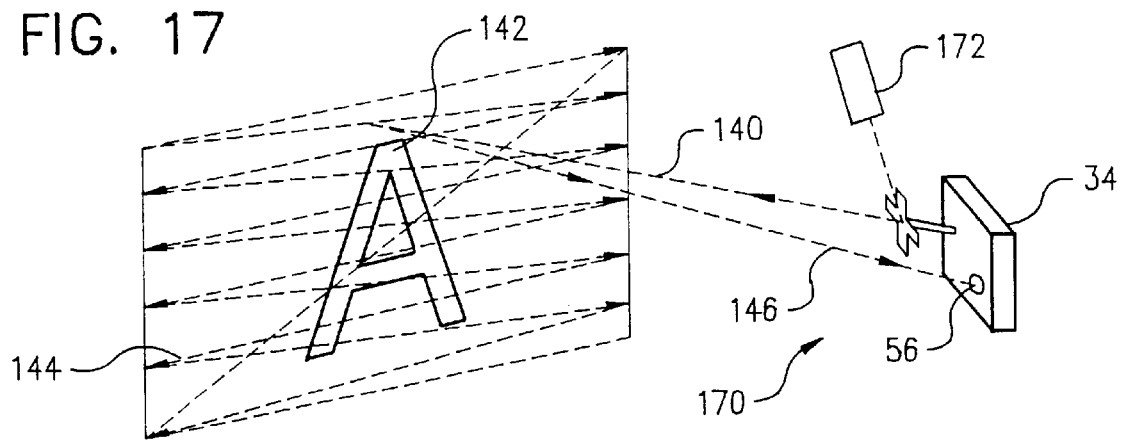
FIG. 17 illustrates the action of an embodiment of the present invention in use as a reflective flying spot scanner.

FIG. 17 illustrates the action of an embodiment of the present invention in use as a reflective flying spot scanner. A scanner 170 is in the configuration detailed in FIG. 13, with the addition of a photoreceptor 56 located on the fixed base 34. A light beam 140 that is reflected off the object 142 (See FIG. 17) is detected by the photoreceptor 56 located on the fixed base 34.

Figure 18:
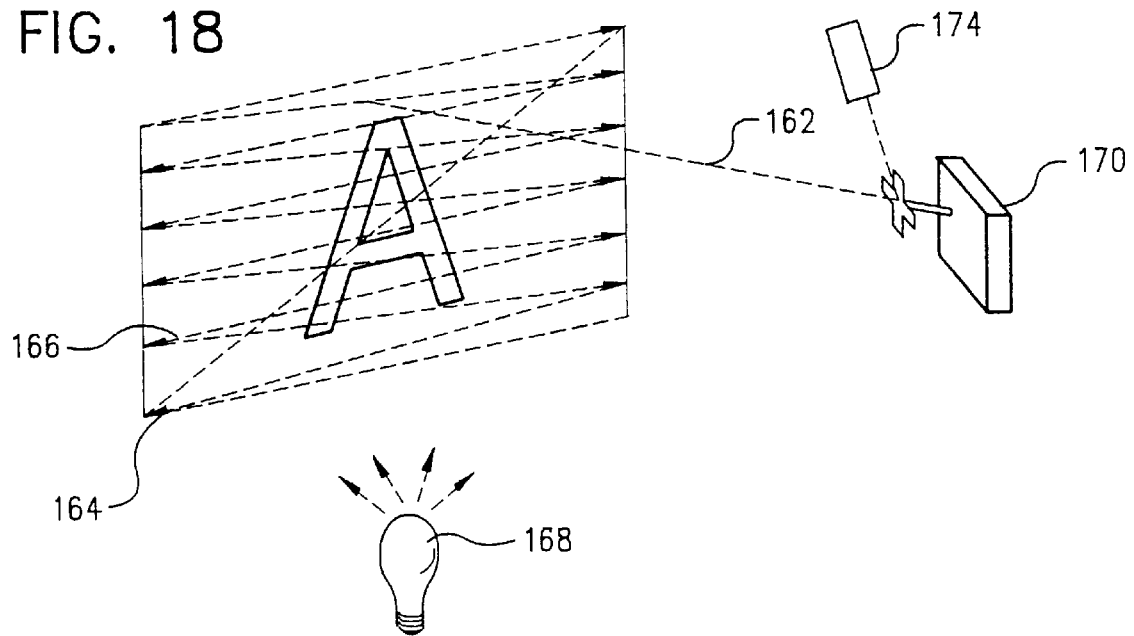
FIG. 18 illustrates the action of an embodiment of the present invention in use as a reflective image dissector.

FIG. 18 illustrates the action of an embodiment of the present invention in use as a reflective image dissector. The scanner 170 is in the configuration detailed in FIG. 13. A beam 162 of ambient light reflected off an object in the image field 164 is detected by a collimated photoreceptor 174. The collimated photoreceptor 174 is scanned across the image field 164 in the motion indicated by the reference numeral 166. The beam 162 of ambient light that is reflected from the object 99 is detected by the radiation detector 43 located on the fixed base 32.

Figure 19A:
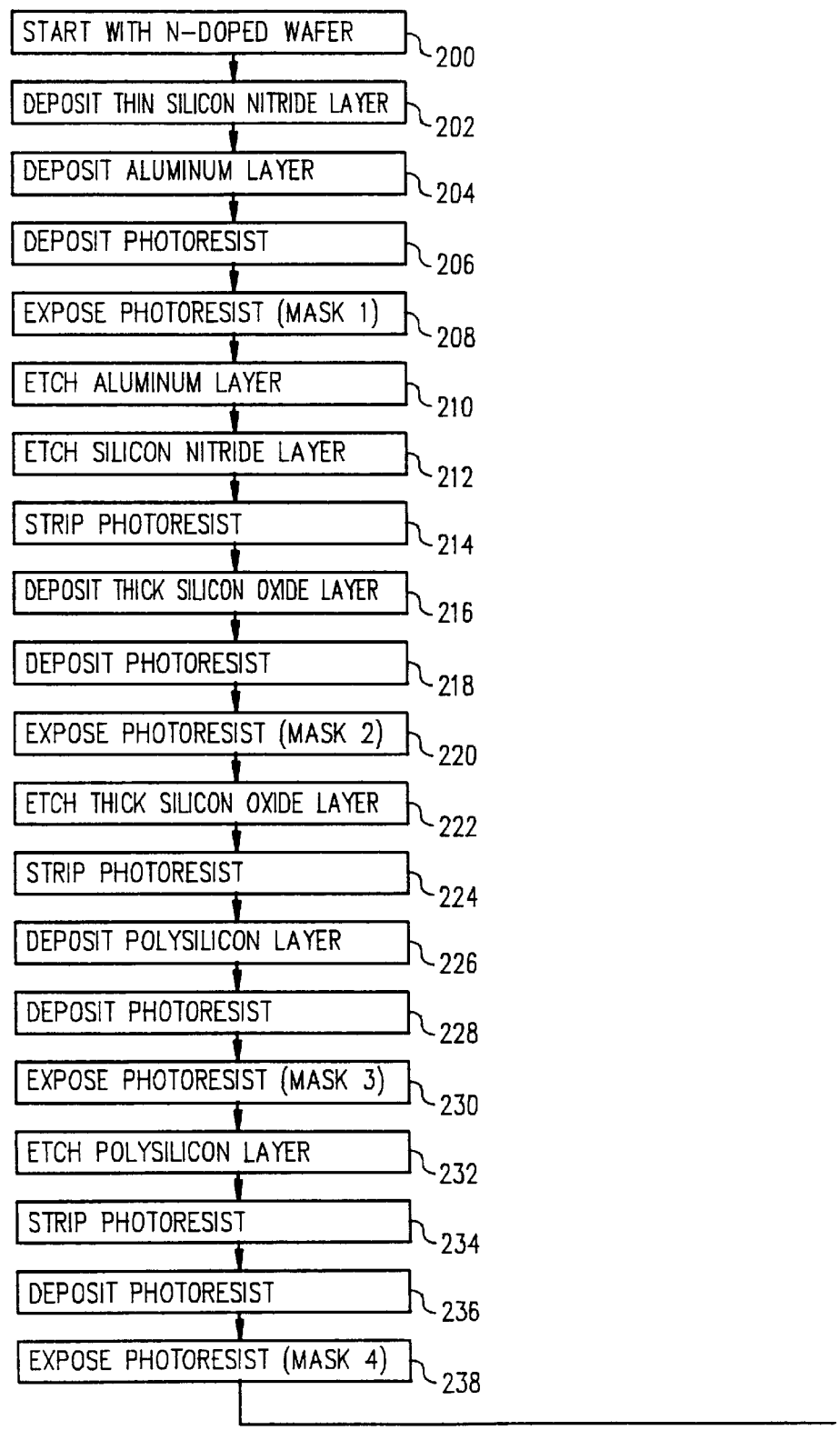
FIGS. 19a and 19b are a flow chart of an exemplary process for producing the illustrated embodiments of the present invention.
Figure 19B:
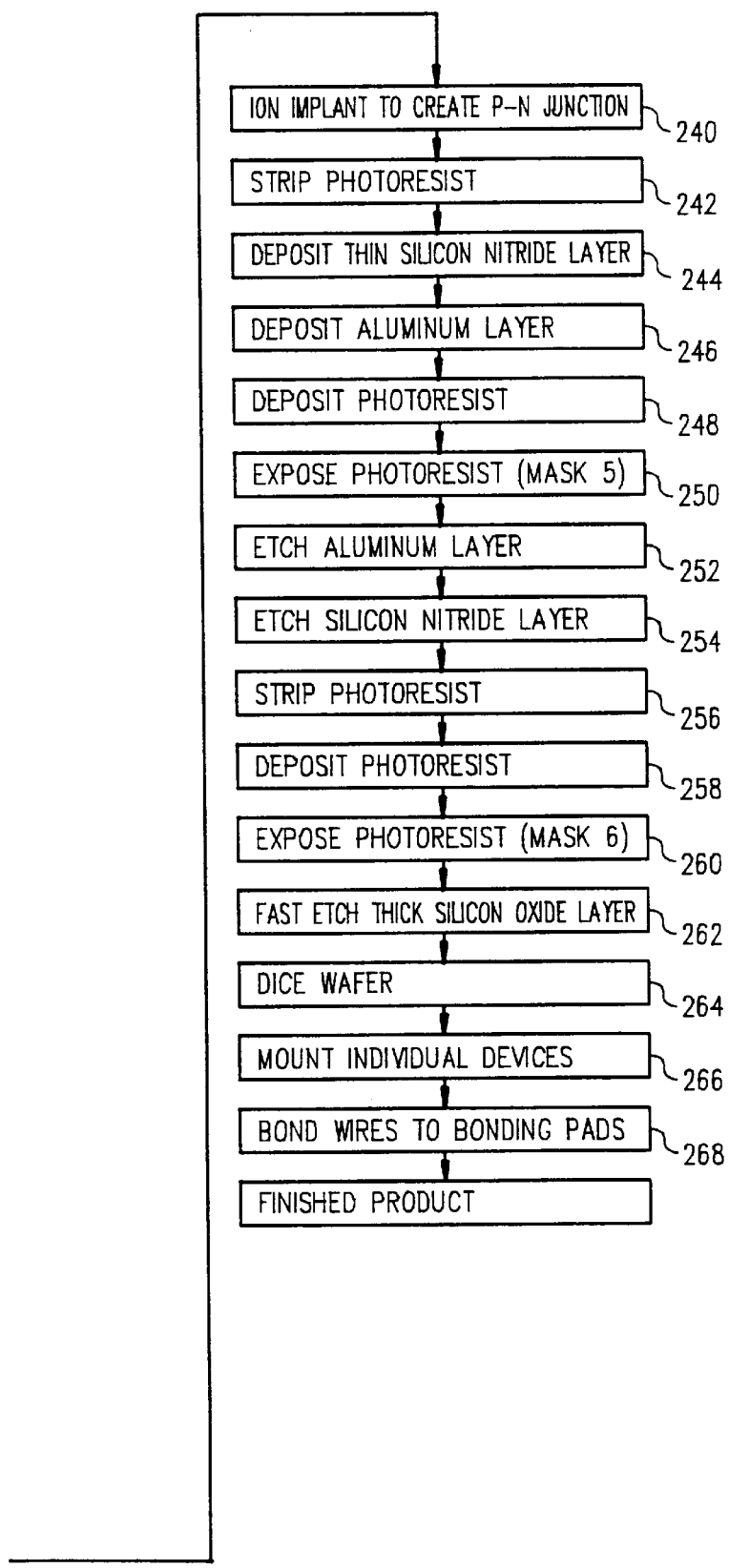

FIGS. 19a and 19b are a flow chart of an exemplary process for producing the illustrated embodiments of the present invention. The steps in the exemplary process are generally conventional steps in a conventional process familiar to those skilled in the art of producing microelectronic circuitry. The process begins with a wafer of n-doped silicon material sliced from an appropriately produced boule (step 200). This wafer serves as the base for the microelectromechanical television scanner of the invention. Next, a thin layer of silicon nitride is deposited over the surface of the wafer of n-doped silicon material (step 202). This produces an insulator between the base and the actuator of the scanner of the present invention. Next a layer of aluminum is deposited over the insulation layer placed in step 202 (step 204). This serves as the material from which the actuator (and specifically, the actuator electrodes 44, 46, 48 and 50) will be formed. Over the surface of the aluminum layer is deposited a layer of photoresist (step 206) which is exposed through the first mask (step 208).

Figure 20:
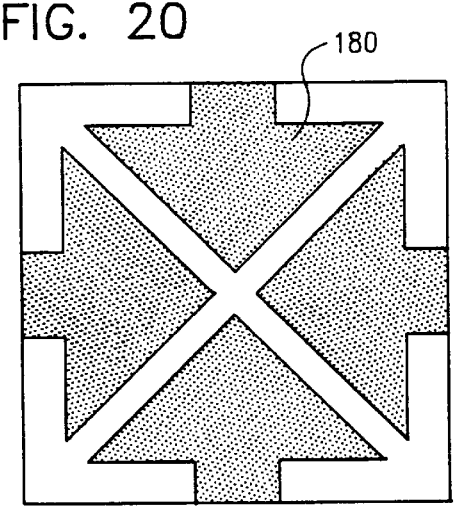
FIG. 20 is a first mask for use with the flow chart of FIGS. 19a and 19b.

FIG. 20 is a first mask for use with the flow chart of FIGS. 19a and 19b. The first mask causes the photoresist deposited in step 206 of FIG. 19a to make the aluminum layer susceptible to etchants which cause the removal of the aluminum layer and the nitride layer in all areas except those which are not exposed through the mask shown in FIG. 20. Therefore, the first mask generates four generally arrowhead-shaped areas 180 to be masked while the rest of the nitride and aluminum layers on the upper surface of the fixed base 34 to be made susceptible to etchants.

Returning to the flow chart of FIGS. 19a and 19b, the portions of the aluminum and silicon nitride layers which have not been protected by the first mask to be respectively etched away, in accordance with conventional processing techniques (steps 210 and 212). Following this, the photoresist deposited in step 206 is stripped from the upper surfaces of the remaining portions of the uppermost aluminum layer (step 214).

Figure 21:
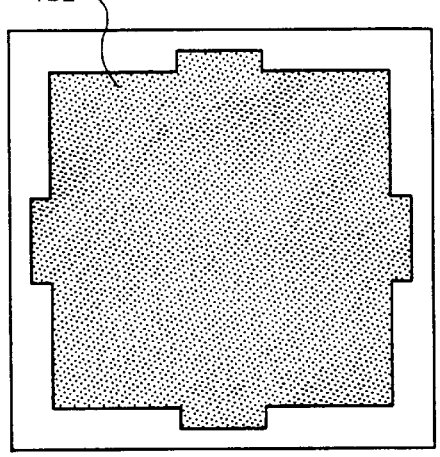
FIG. 21 is a second mask for use with the flow chart of FIGS. 19a and 19b.

Next a thick layer of silicon oxide is formed over the base, silicon nitride and aluminum layers of the wafer (step 216). The purpose of the layer of silicon oxide deposited in step 216 is to electrically insulate the aluminum layer from the remainder of the transducer, and its thickness is great enough to produce the desired degree of electrical insulation. However, the primary purpose of this layer is to provide a support for further construction of the device. Eventually, this layer will be removed by etching. Next, a second layer of photoresist is formed over the thick layer of oxide, in accordance with the pattern 182 of a second mask (step 218). FIG. 21 is a second mask for use with the flow chart of FIGS. 19a and 19b. It defines the areas over the aluminum electrodes formed previously which are to be electrically insulated and on which polysilicon will be deposited.

Returning to the flow chart of FIG. 19a, the photoresist layer deposited in step 218 is exposed through the second mask to define the shape of the insulation (preferably taking the form of a thick layer of silicon dioxide placed over the aluminum electrodes) (step 220). Next, the thick silicon oxide layer is etched from those areas exposed through the second mask (step 222), leaving the desired insulation (i.e., the thick silicon oxide patch). After the insulation patch has been formed, the photoresist deposited in step 218 is stripped away (step 224).

Figure 22:
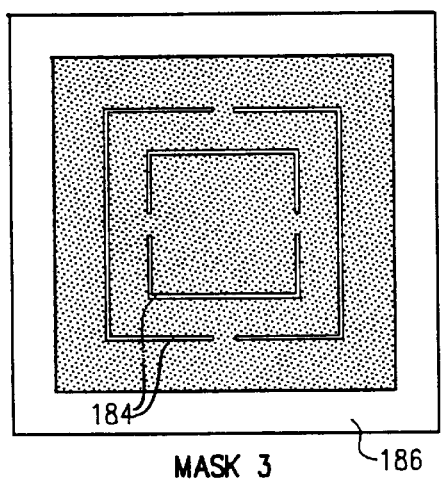
FIG. 22 is a third mask for use with the flow chart of FIGS. 19a and 19b.

The next stages in the process described in the flow chart of FIGS. 19a and 19b define the gimbal of the second preferred embodiment of the scanner of the present invention (see FIGS. 2 and 2a). A layer of conventional polysilicon is deposited over the insulated (by means of a thick silicon oxide layer placed over) aluminum electrodes (step 226) and a layer of photoresist formed over the upper surface of the layer of polysilicon (step 228). The layer of silicon polysilicon is exposed through a third mask (step 230). FIG. 22 is a third mask for use with the flow chart of FIGS. 19a and 19b. The third mask defines the perforations 184 which create the gimbal mechanism, which allows the scanner to move mechanically in response to electrical signals which will be supplied to it. An additional area of polysilicon 186 is etched away which provides future attachment openings for the lower aluminum electrodes. The gimbal shown in FIG. 22 has two pairs of pivot points arranged orthogonally to one another. If desired any other appropriate type of gimbal device, such as the spiral gimbal shown in FIG. 3 may be formed at this stage.

As shown in FIG. 19a, the polysilicon layer deposited in step 226 is etched in accordance with the pattern produced by exposing the photoresist through the third mask (step 232) and then the photoresist deposited in step 228 is stripped away (step 234).

Figure 23:
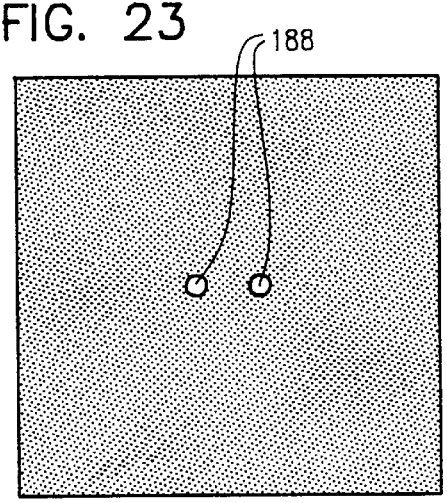
FIG. 23 is a fourth mask for use with the flow chart of FIGS. 19a and 19b.

In the next stage of processing, the photodiodes 126 on the upper surface of the scanner are produced (see FIGS. 10 and 11). The process begins with the deposit of a layer of photoresist over the entire upper surface of the device at this stage of its production (step 236). The deposited photoresist is then exposed through the fourth mask (step 238). FIG. 23 is the fourth mask for use with the flow chart of FIGS. 19a and 19b. The fourth mask defines two small circles 180 at the center of the scanner. p-type ions are implanted through the two small circles 180 to produce the pn junction of the photodiode 126 (step 240) and the photoresist deposited in step 236 is stripped away (step 242).

The next stage of processing is to produce the insulated connections between the photodiode 126 formed in steps 236–242 and the external world. First, a thin silicon nitride layer is formed over the upper surface of the scanner as it exists at this stage of the process (step 244). This will serve as the insulator 114 between the interconnections and the remainder of the scanner (see FIGS. 10 and 11). Next an aluminum layer is deposited over the thin nitride layer formed in step 244 (step 246). After this, a layer of photoresist is deposited (step 248) and the photoresist exposed through a fifth mask (step 250).

Figure 24:
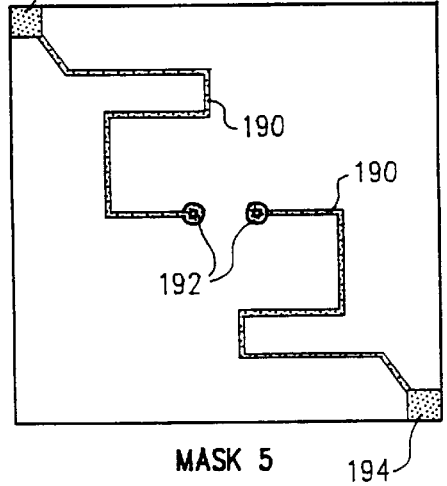
FIG. 24 is a fifth mask for use with the flow chart of FIGS. 19a and 19b.

FIG. 24 is a fifth mask for use with the flow chart of FIGS. 19a and 19b. The fifth mask produces the electrical traces 190 between the photodiodes 192 formed previously and pads 194. The aluminum layer formed in step 246 is stripped away according to the pattern of the fifth mask (step 252), the nitride layer deposited in step 244 is stripped away (step 254) and the photoresist deposited in step 248 is then stripped away (step 256).

Figure 25:
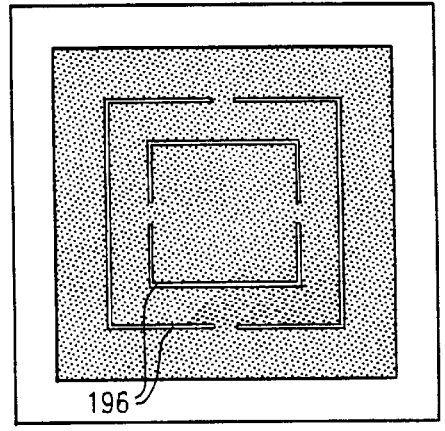
FIG. 25 is a sixth mask for use with the flow chart of FIGS. 19a and 19b.

In the next stage of the process shown in the flow charts of FIGS. 19a and 19b, the cross-shaped central plate and gimbal ring are formed by undercutting the oxide formed in step 216 to separate the resulting thin layer from the base layer formed by the original wafer of silicon material. This is accomplished by depositing a layer of a photoresist (step 258) and exposing the photoresist through a sixth mask (step 260). FIG. 25 is an example of the sixth mask for use with the flow chart of FIGS. 19a and 19.

In accordance with the pattern 196 of photoresist deposited in step 258 and exposed in step 260, the thick oxide layer is etched away using a fast etchant (step 262). This causes the oxide under the photodiodes to be etched away, leaving only a thin layer of elevated polysilicon having the photodiodes formed thereon.

Now that the exemplary embodiment of the scanner of the present invention has been formed on the upper surface of the base material of n-doped wafer, it is separated from the remainder of the wafer by dicing the wafer (step 264). It is understood by those skilled in the art that many copies of scanners can be produced simultaneously by using conventional microcircuit processing techniques. Thereafter, the individual devices are mounted on bases (step 266) and appropriate electrical connections are made to the pads formed in steps 244–256 (step 268). The result is the desired scanner.

Figure 26:
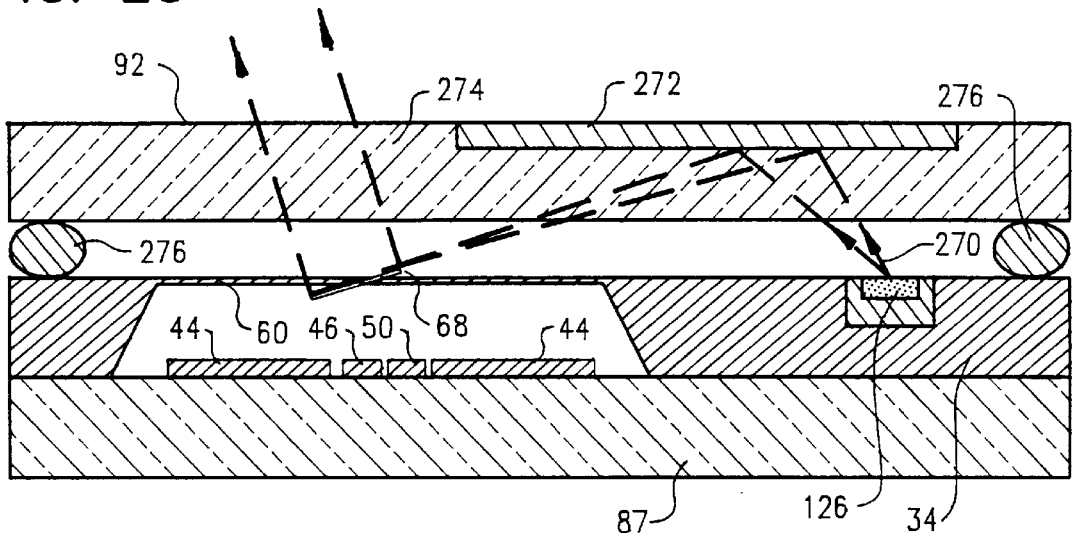
FIG. 26 is a side view of a preferred embodiment of the invention.
Figure 27A:
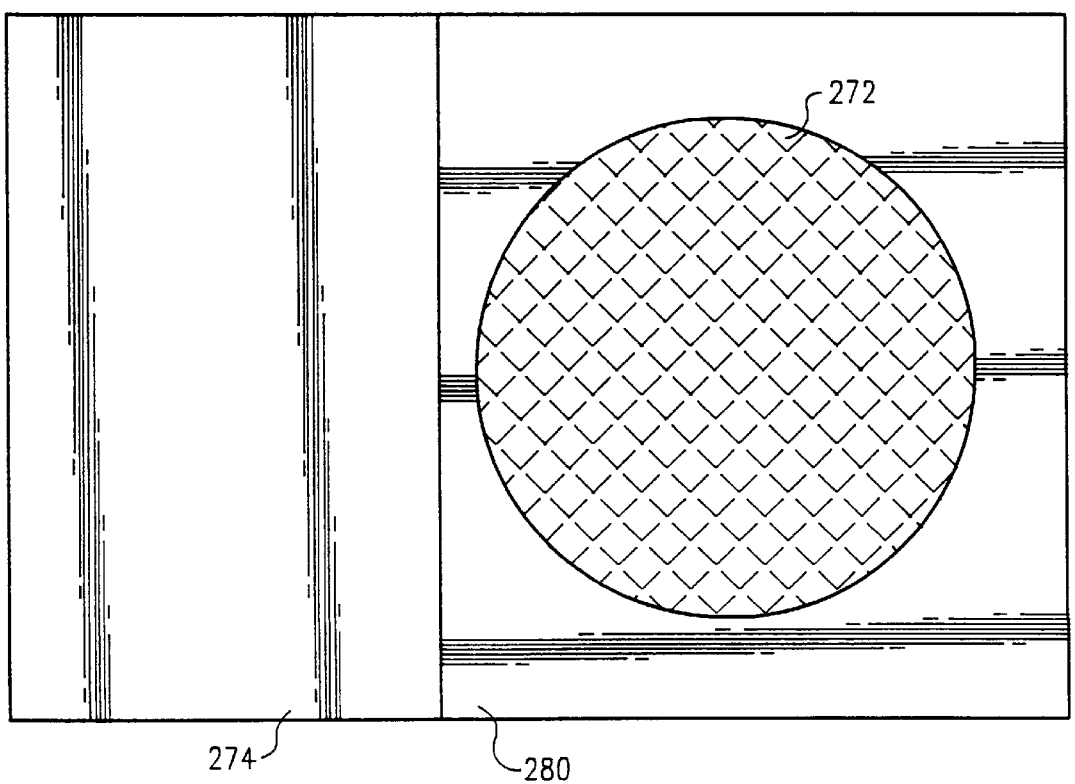
FIG. 27a is a top view of a glass wafer of the invention.
Figure 27B:
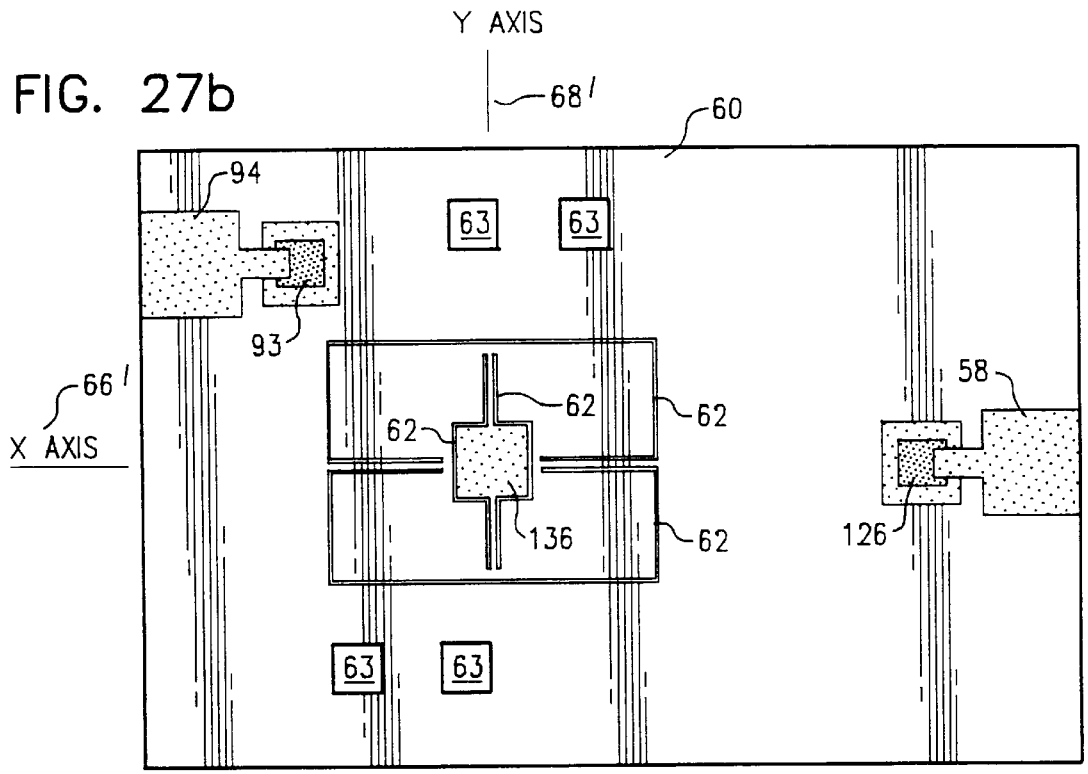
FIG. 27b is a top view of a thin film of the invention.

FIGS. 26, 27a and 27b are detailed views of a moving reflector configuration in accordance with the present invention. FIG. 26 is a side view of the configuration. Light 270 emitted from the laser diode 116 is reflectively collimated by the holographic optical element 272 which is made of deposited aluminum or other dielectric reflector. The holographic optical element 272 is fabricated on a transparent glass wafer 274 as will be discussed below. The glass wafer 274 is suspended above the thin film 60 by flip chip solder balls 276. Light reflected and collimated by the holographic optical element 272 is directed to the central scanning plate mirror 68 from which it is directed through the transparent glass wafer 274 to the object being imaged.

FIG. 27a is a top view of the glass wafer 274. A reflective covering 278 prevents stray light emission from the laser diode 116. The holographic optical element 272 is fabricated on the reflective covering 280.

FIG. 27b is a top view of the thin film 60. An additional stationary photodetector 282 connects to a pickup 284 for electrical connection. This detector picks up light that is reflected off the imaged object. The configuration of photodetector 56 and electrode 58 is identical to that in FIG. 2.

Figure 28:
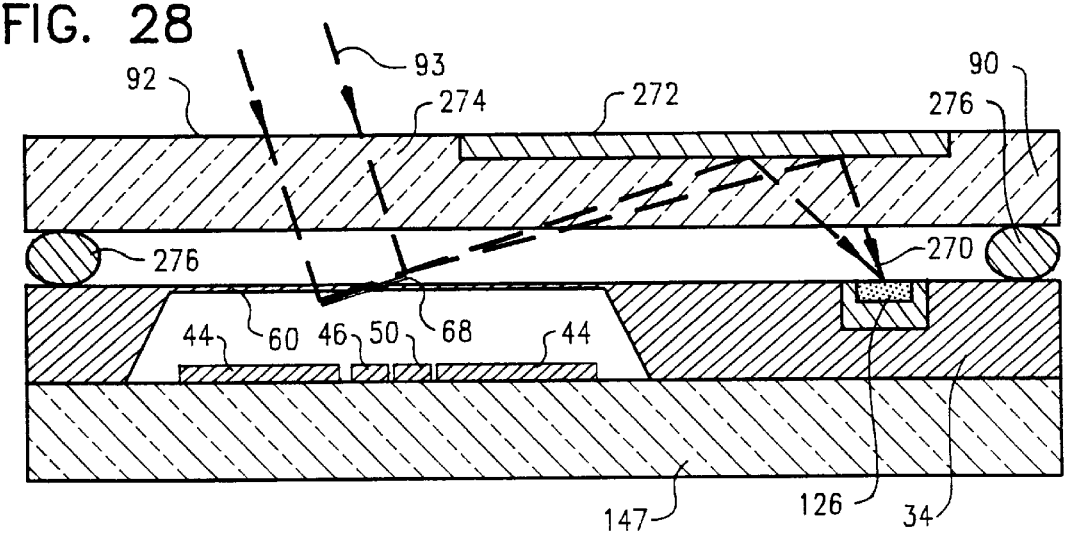
FIG. 28 is a side view of a configuration of the invention.
Figure 30B:
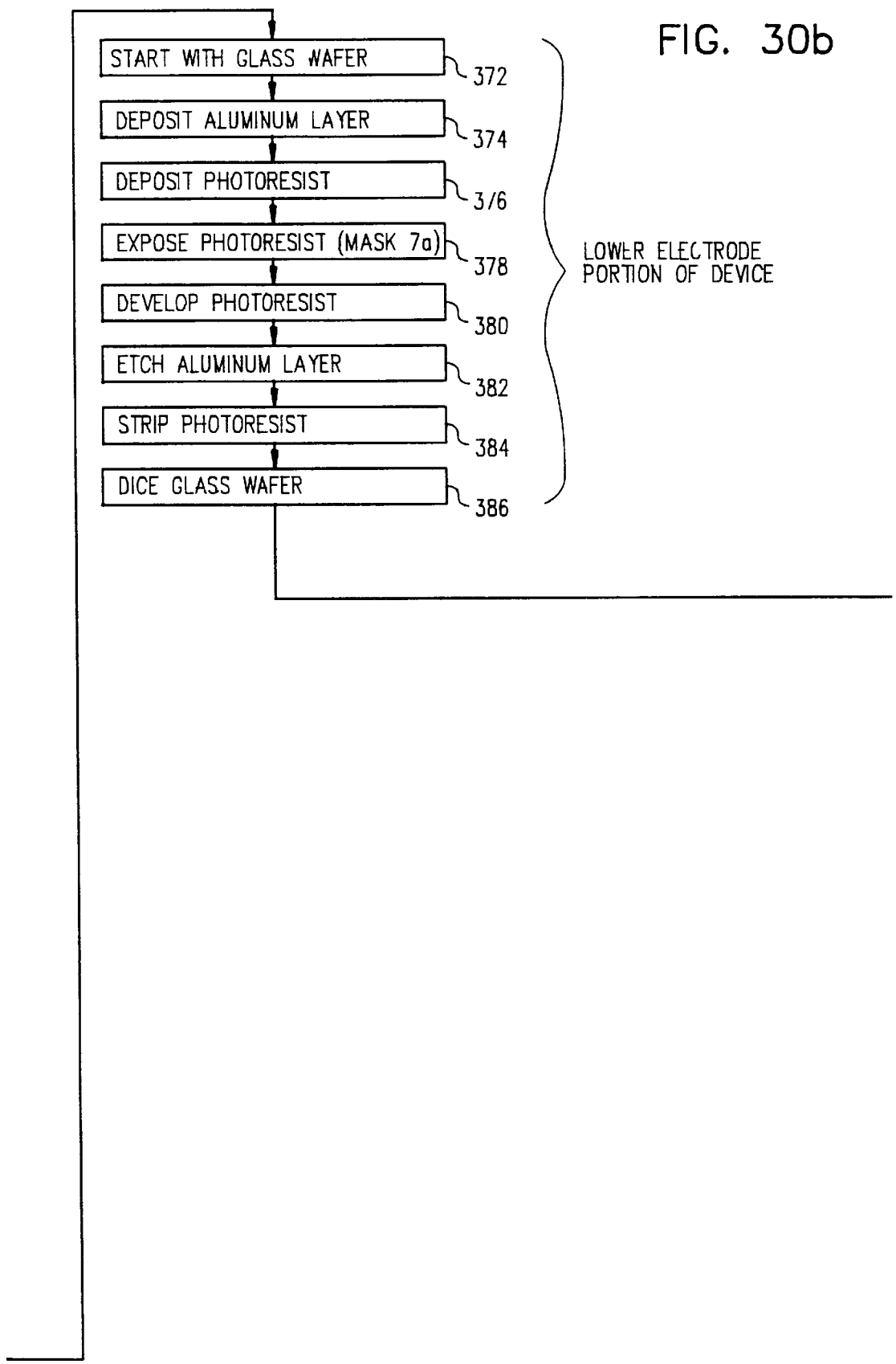
Figure 30C:
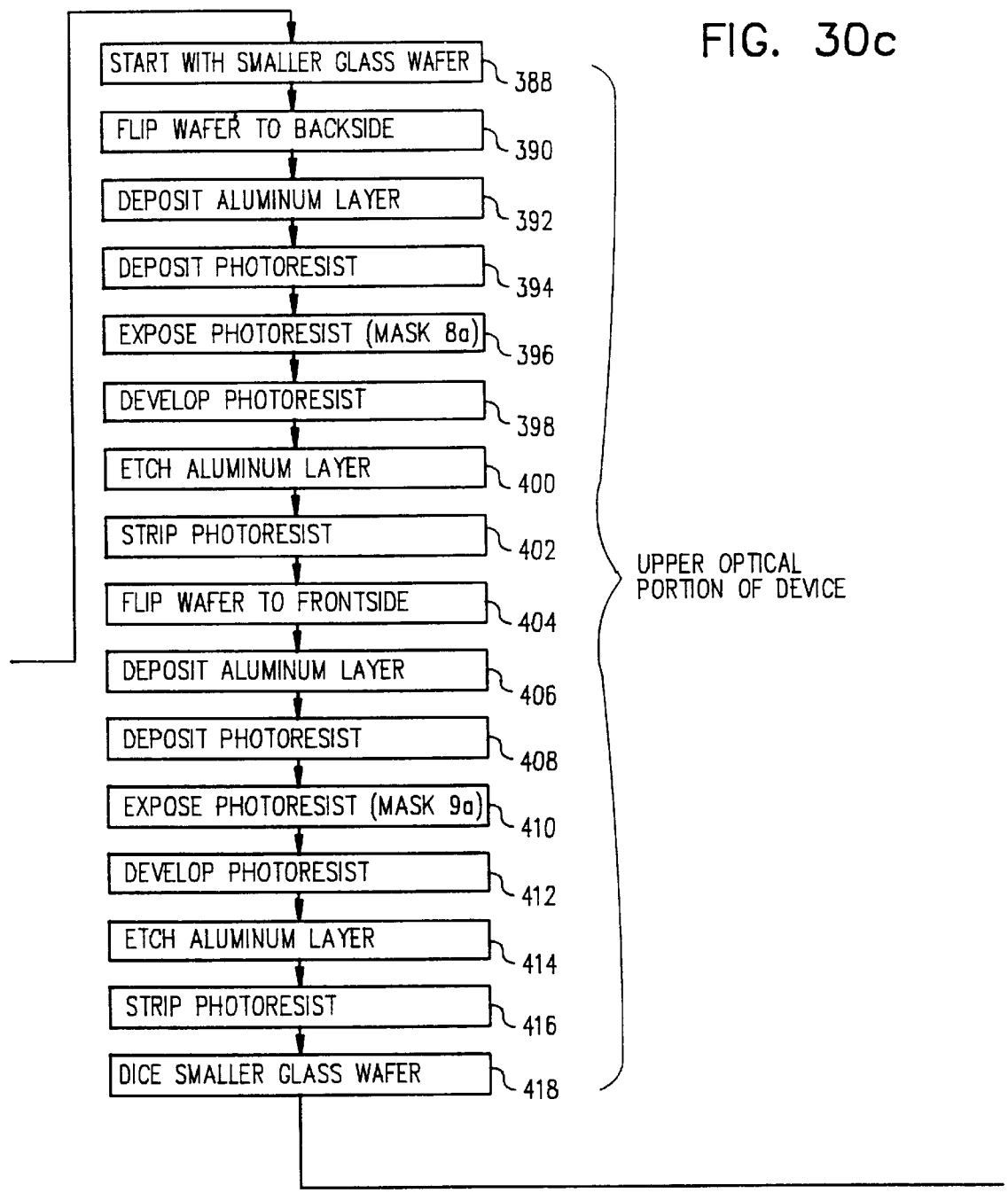

FIGS. 28 and 29 are detailed views of a moving reflector image dissector scanner configuration in accordance with the present invention. FIG. 28 is a side view of the configuration. The device in FIGS. 28 and 29 is identical to that in FIG. 26 except for the light path 93, the radiation detector 126 and the stationary radiation emitter 282 with an associated electrode 284.

FIG. 29 is a top view of the thin film 60. An additional stationary radiation emitter 282 connects to an electrode 284 for electrical connection. The radiation emitter 282 illuminates the subject being imaged. The lower electrode configuration is identical to that in FIG. 2a. The electrode base 147 corresponds to 34 in FIG. 2a.

FIGS. 30a–d are a flow chart of another exemplary process for producing an illustrated embodiment of the present invention. The steps in the exemplary process are generally conventional steps in a conventional process familiar to those skilled in the art of producing microelectronic circuitry. The process begins with a wafer of n-doped silicon material sliced from an appropriately produced boule (step 300).

Figure 31:
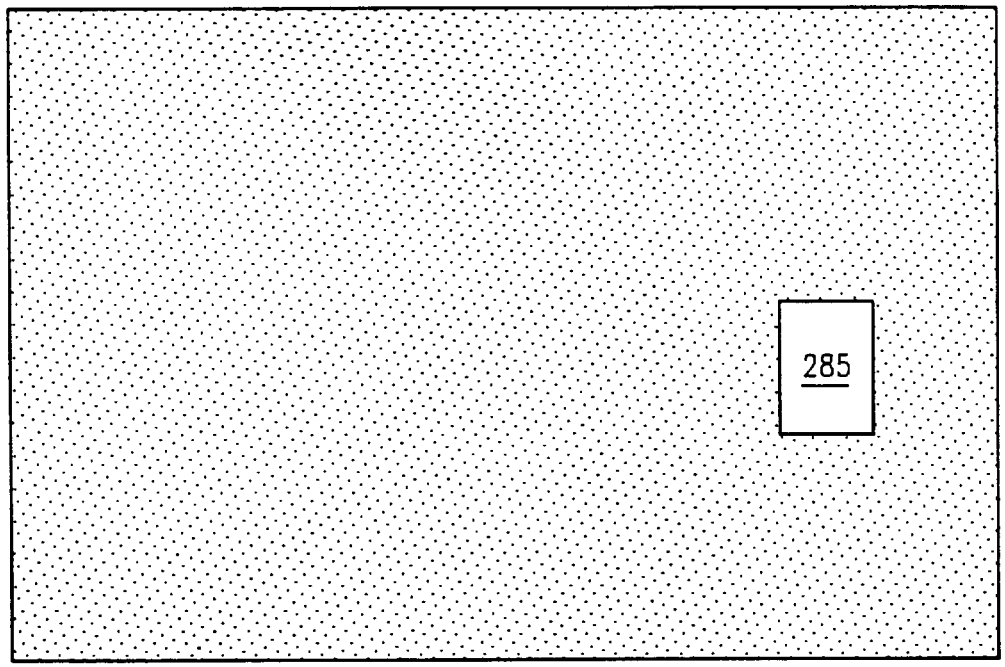
FIG. 31 is a first mask for use with the flow chart of FIGS. 30a–d.

A photoresist is then deposited on the silicon wafer (step 302) and exposed to mask 1a (FIG. 31) (step 304). The photoresist is then developed (step 306). The silicon wafer is then ion implanted (step 308) to create a p-doped region according to the areas exposed by the developed photoresist. The photoresist is then stripped (step 310) from the silicon wafer. Steps 302 through 310 form a p-doped region 285 which will electrically isolate the n-p junction photodiode 126 from the surrounding wafer.

Figure 32:
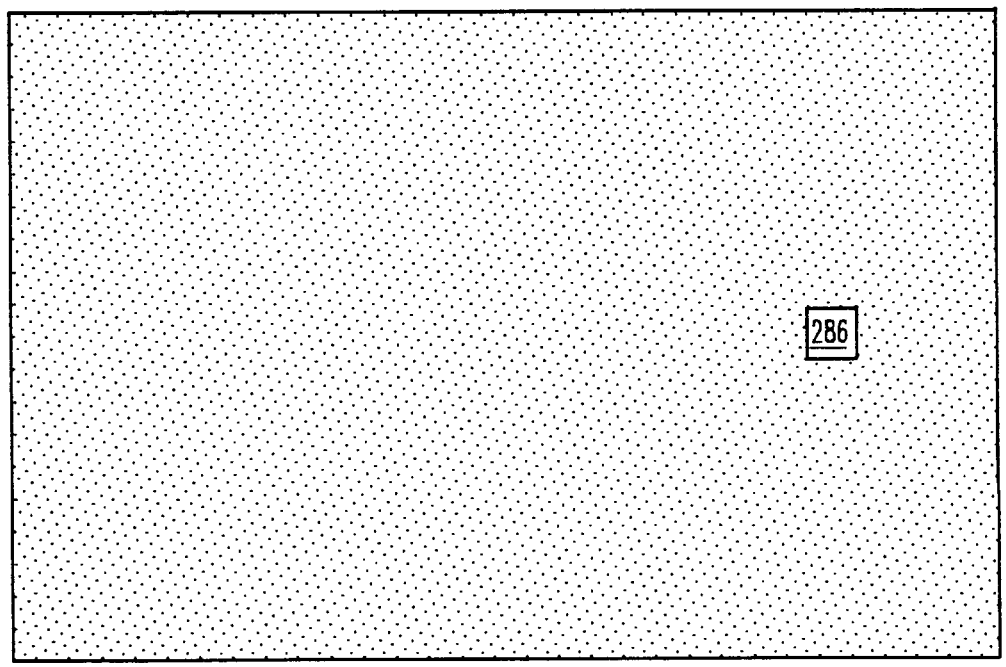
FIG. 32 is a second mask for use with the flow chart of FIGS. 30a–d.

A photoresist is then deposited on the silicon wafer (step 312) and exposed to mask 2a (FIG. 32) (step 314). The photoresist is then developed (step 316). The silicon wafer is then ion implanted (step 318) to create an n-doped region according to the areas exposed by the developed photoresist. The photoresist is then stripped (step 320) from the silicon wafer. Steps 312 through 320 form an n-doped region 286 which will become the n-side of the n-p junction photodetector from the silicon wafer.

A layer of polysilicon is deposited on the face of the silicon wafer (step 322). A photoresist is then deposited on the silicon wafer (step 324) and exposed to mask 3a (FIG. 33) (step 326). The photoresist is then developed (step 328). The layer of polysilicon is then etched (step 330) according to the areas exposed by the developed photoresist. The photoresist is then stripped (step 332) from the layer of polysilicon. Steps 322 through 332 form a polysilicon layer with through etched area 288 which is cleared for the n-p junction photodiode 126, areas 290 which are cleared for through holes for lead connectivity to lower electrostatic actuator electrodes and areas 291 for gimbal construction.

A layer of thin silicon nitride is deposited on the face of the silicon wafer (step 334). A photoresist is then deposited on the silicon wafer (step 336) and exposed to mask 4a (FIG. 34) (step 338). The photoresist is then developed (step 340). The layer of thin silicon nitride is the etched (step 342) according to the areas exposed by the developed photoresist. The photoresist is then stripped (step 344) from the layer of thin silicon nitride. Steps 334 through 344 form an insulating layer with through holes 292 cleared for access to the n-p junction isolated photodetector 126.

Figure 35:
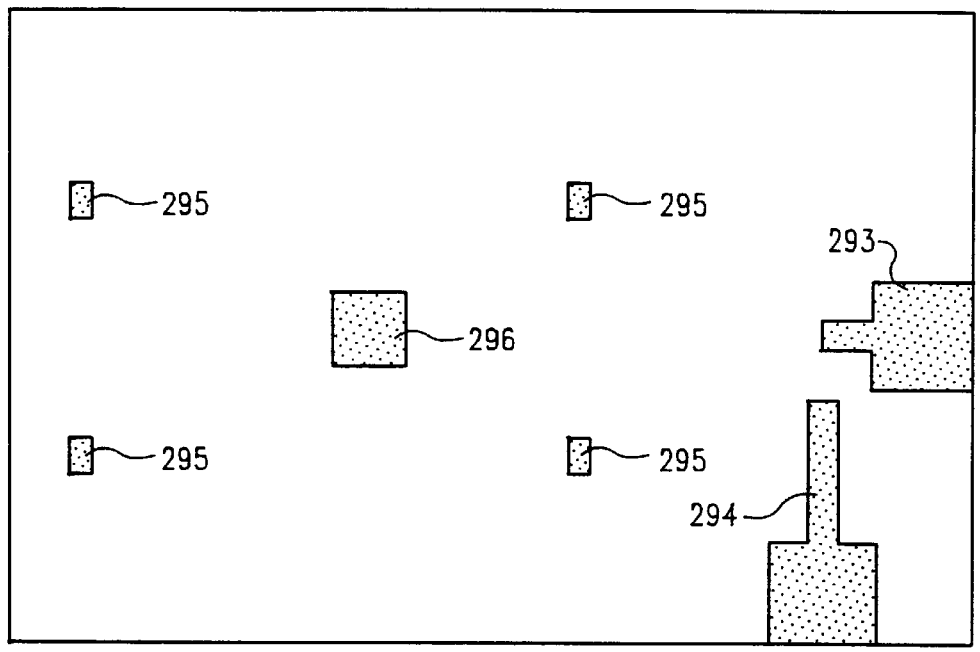
FIG. 35 is a fifth mask for use with the flow chart of FIGS. 30a–d.

A layer of aluminum is deposited on the face of the silicon wafer (step 346). A photoresist is then deposited on the silicon wafer (step 348) and exposed to mask 5a (FIG. 35) (step 350). The photoresist is then developed (step 352). The layer of aluminum is then etched (step 354) according to the areas exposed by the developed photoresist. The photoresist is then stripped (step 356) from the layer of aluminum. Steps 346 through 356 form a conductor 293 from the n-doped region of the n-p photodetector, a conductor 294 for the p-doped region of the n-p photodetector, flip chip bonding pads 295, and the scanning mirror reflective surface 296.

Figure 36:
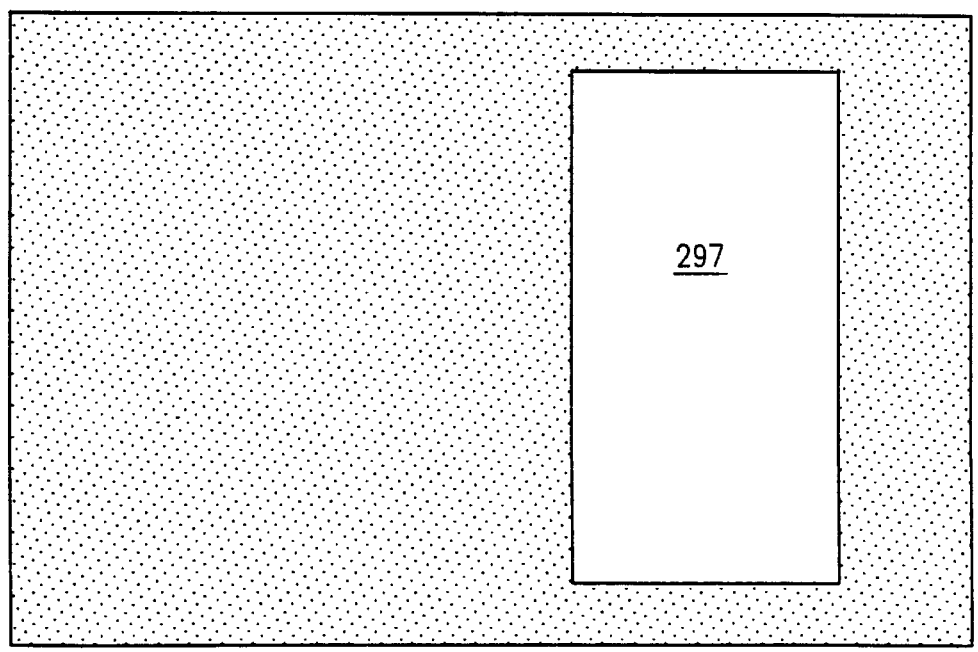
FIG. 36 is a sixth mask for use with the flow chart of FIGS. 30a–d.

The silicon wafer is then rotated to process the backside of the silicon wafer (step 358). A photoresist is then deposited on the backside of the silicon wafer (step 360) and exposed to mask 6a (FIG. 36) (step 362). The photoresist is then developed (step 364). The silicon wafer is then etched (step 366) through to the polysilicon layer according to the areas exposed by the developed photoresist. The photoresist is then stripped (step 368) from the silicon layer backside. Steps 358 through 368 form a deep well 297 from the backside of the wafer to the polysilicon layer. This deep well 297 permits the gimbal to rotate out of plane of the polysilicon layer in addition to providing lead access to the lower electrostatic actuator pads.

Next, the silicon wafer is diced (step 370) to separate the individual scanner units for further processing.

The lower layer containing the electrostatic actuator electrodes is formed on a glass wafer 298 of similar dimensions to the silicon wafer used in steps 300–370.

Figure 37:
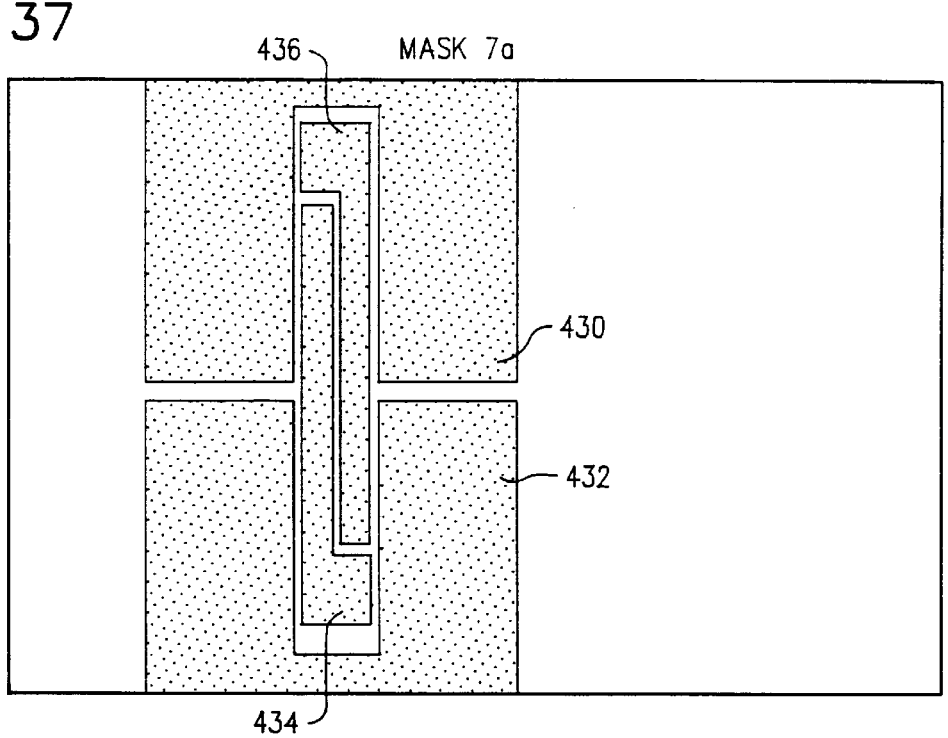
FIG. 37 is a seventh mask for use with the flow chart of FIGS. 30a–d.

A layer of aluminum is deposited on the face of the glass wafer (step 374). A photoresist is then deposited on the glass wafer (step 376) and exposed to mask 7a (FIG. 37) (step 378). The photoresist is then developed (step 380). The layer of aluminum is the etched (step 382) according to the areas exposed by the developed photoresist. The photoresist is then stripped (step 384) from the layer of aluminum. Steps 374 through 384 form the lower electrostatic electrodes 430, 432, 434 and 436.

The glass wafer is then diced (step 386) to the same dimensions as the silicon wafer scanner components diced in step 370.

The upper layer containing the optical elements of the scanner are formed on a smaller glass wafer relative to the silicon wafer used in steps 300–370. This glass wafer is then rotated to permit backside processing (step 372).

Figure 38:
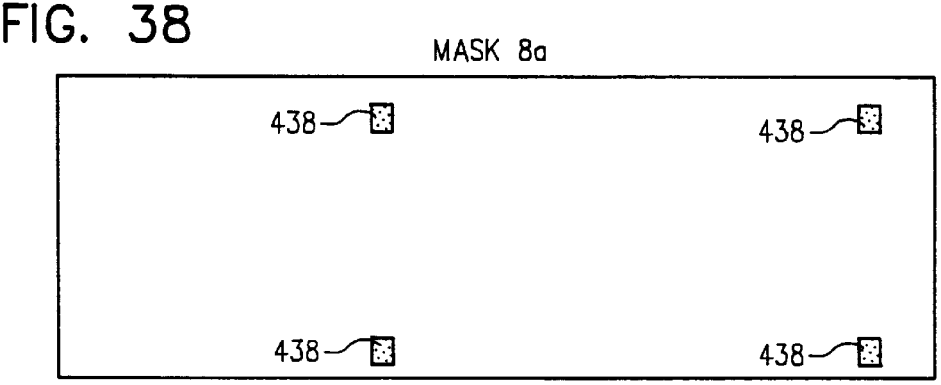
FIG. 38 is a eighth mask for use with the flow chart of FIGS. 30a–d.

A layer of aluminum is deposited on the back face of the silicon wafer (step 392). A photoresist is then deposited on the glass wafer (step 394) and exposed to mask 8a (FIG. 38) (step 396). The photoresist is then developed (step 398). The layer of aluminum is then etched (step 400) according to the areas exposed by the developed photoresist. The photoresist is then stripped (step 402) from the layer of aluminum. Steps 392 through 402 form the flip chip bonding pads 438 for eventual assembly use. The glass wafer is then rotated to the front side for further processing.

Figure 39:
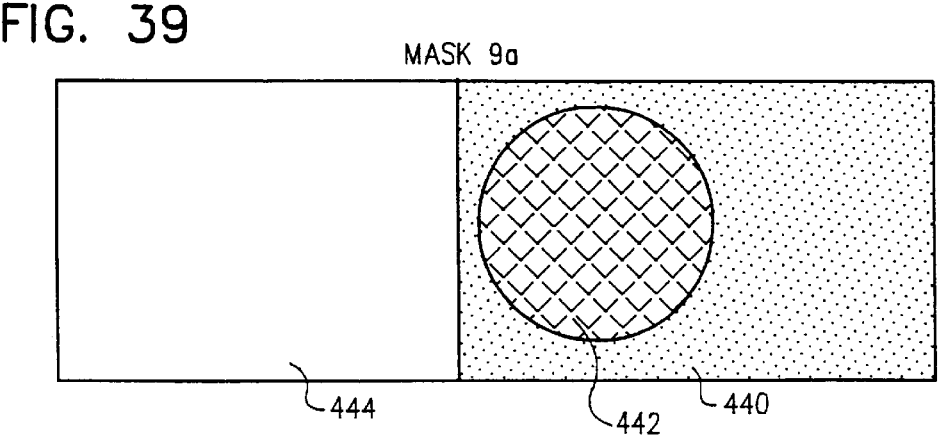
FIG. 39 is a ninth mask for use with the flow chart of FIGS. 30a–d.

A layer of aluminum is deposited on the front face of the glass wafer (step 406). A photoresist is then deposited on the glass wafer (step 408) and exposed to mask 9a (FIG. 39) (step 400). The photoresist is then developed (step 412). The layer of aluminum is then etched (step 414) according to the areas exposed by the developed photoresist. The photoresist is then stripped (step 416) from the layer of aluminum. Steps 406 through 414 form the reflective opaque area 440, the holographic optical element 442 and the clear area 444.

Finally, the smaller glass wafer is diced to a dimension slightly smaller than the wafers diced in steps 370–386. Final assembly of the device includes mounting the diced lower electrode chip formed in steps 372–386 to the diced silicon chip fabricated in steps 300–370. The chips are aligned and bonded using adhesives, welding or electro-bonding techniques known in prior art. The backside of the upper optical chip of the device is bonded with the front side of the diced silicon chip (step 422). The bonding method used is flip chip bonding which is known in prior art. The bonding pads formed in steps 350 and 396 are used in the flip chip bonding process.

The entire assembly is then bonded to a packaging assembly (step 426) with the scanning mirror 88 exposed to the outer environment. Finally, lead wires are bonded (step 428) to the assembly for connection to external devices.

Figure 40A:
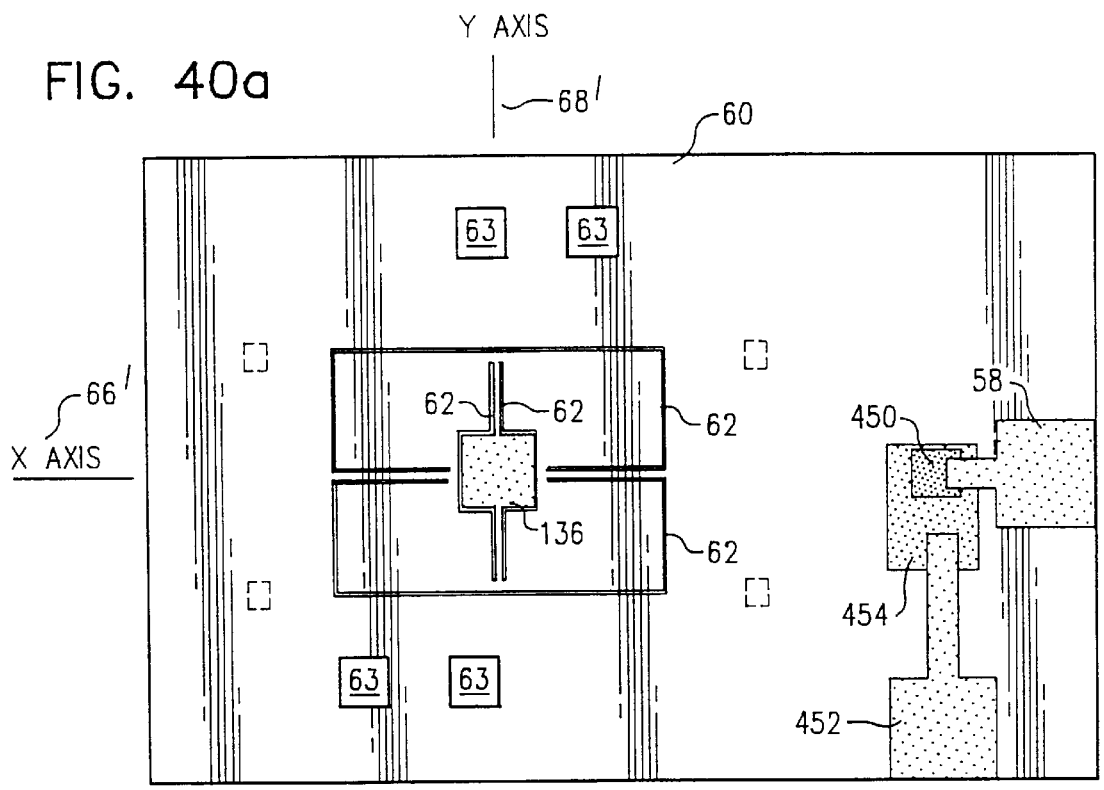
FIGS. 40a and 40b are views of the fabricated device from the flow chart of FIGS. 30a–d.
Figure 40B:
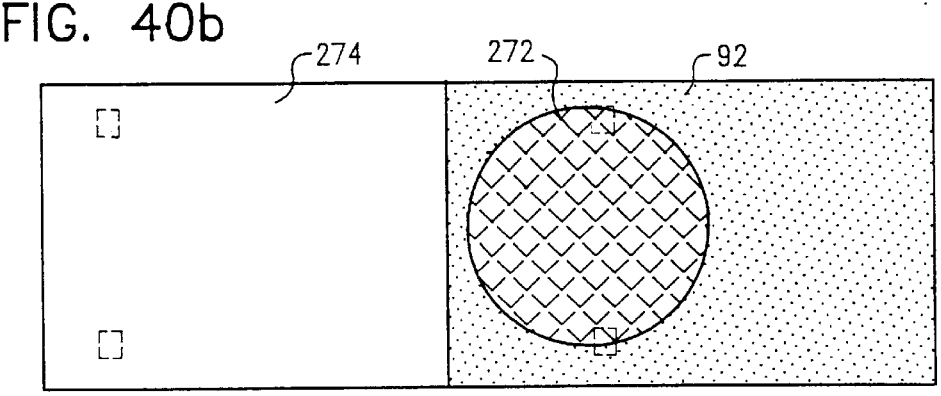

FIGS. 40a and 40b are top views of the silicon chip and upper optical chip respectively. This device is very similar to the device illustrated in FIGS. 29 and 29a, respectively. The differences are the absence of the radiation source 282, the associated electrode 284, and the addition of a junction isolated n-p junction photodetector 450 with ground lead 452 and active lead 454. Photodetector 450 is made from n-doped silicon and active lead 454 is made from p-doped silicon. This configuration prevents electrical interference from actuator signals.

Figure 41:
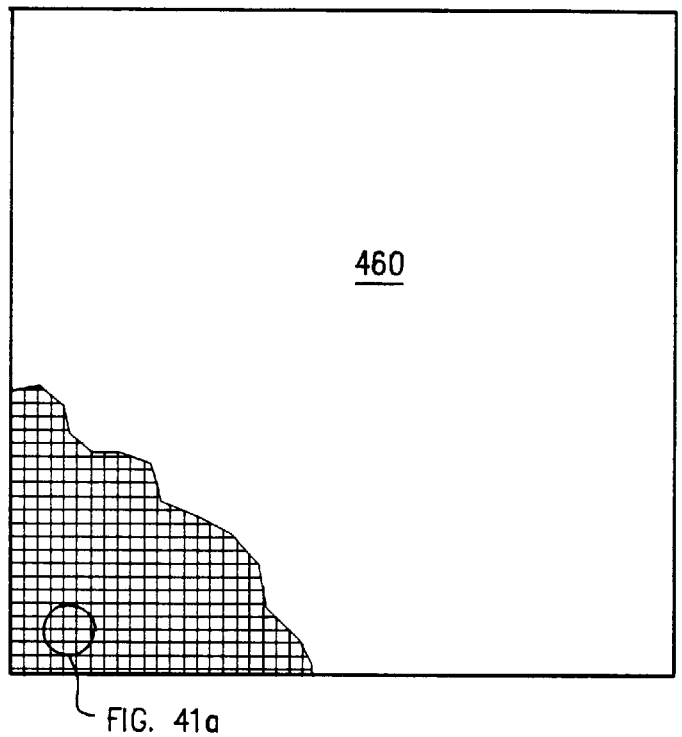
FIG. 41 is a top view of an array of individual copies of the scanning device of the present invention.

FIG. 41 is a top view of an array of individual copies of the scanning device of the present invention. The array 450 can typically consist of a rectangular orientation of the scanning devices, which share their edges with other copies of the scanning devices. The individual copies of the scanning devices can be operated separately, or under coordinated control of a controller, such as a programmed computer to achieve such effects as pseudo-three-dimensional visual displays. Similarly, an array 450 of the scanning devices can much more rapidly sample a visual scene than can an individual scanner.

Figure 41A:
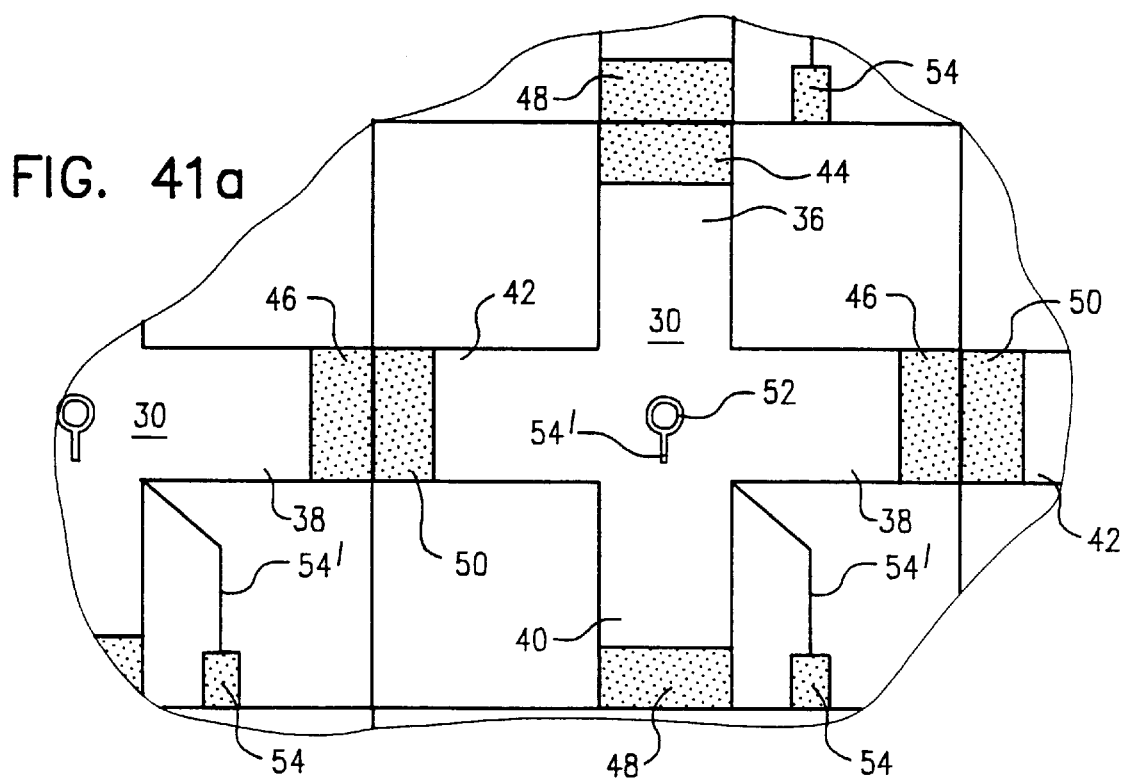
FIG. 41a is a close-up view of a portion of the array shown in FIG. 40.

FIG. 41a is a close-up view of a portion of the array 450 shown in FIG. 40. As can be seen by reference to FIG. 41a, the individual copies of the inventive scanner have the features of an individual scanner, such as that shown in FIG. 1.

It will thus be seen that the objects set forth above, and those made apparent in the foregoing description, are effectively attained and since certain changes may be made in the above construction without departing from the scope of the invention, all matters contained in the foregoing description or shown in the accompanying drawings should be interpreted as illustrative and not in a limiting sense.

It is also understood that the following claims are intended to cover all of the generic and specific features of the invention herein described, and all statements of the scope of the invention which, as a matter of language, might be said to fall therebetween.

I claim:

1. A two-axis gimbal comprising a planar microelectro-mechanical ("MEMs") film substrate, the film substrate including a first cut-out region rotatably connected to an outer region of the film substrate in a manner to permit controlled free out-of-plane rotation of the first region relative to the outer region, and a second cut-out region rotatably connected to and nested within the first cut-out region in a manner to permit controlled free out-of-plane rotation of the second region relative to the first region, and wherein the axis of rotation of the first cut-out region is oriented substantially 90 degrees with respect to the axis of rotation of the second cut-out region, and wherein the cutout regions are rotated by applying an independent rotational force to each respective cut-out region.

2. The gimbal of claim 1, wherein the first cut-out region is rotatably connected to the surrounding outer region by a pair of collinear, torsionally flexible supports.

3. The gimbal of claim 1, wherein the second cut-out region is rotatably connected to the surrounding outer region by a pair of collinear, torsionally flexible supports.

4. A two-axis gimbal comprising a planar microelectro-mechanical ("MEMs") film substrate, the film substrate including a first cut-out region rotatably connected to an outer region of the film substrate in a manner to permit controlled free out-of-plane rotation of the first region relative to the outer region, and a second cut-out region rotatable connected to and nested within the first cut-out region in a manner to permit controlled free out-of-plane rotation of the second region relative to the first region, wherein the second cut-out region carries a photoelectric device, and wherein the axis of rotation of the first cut-out region is oriented substantially 90 degrees with respect to the axis of rotation of the second cut-out region.

5. A two-axis gimbal comprising a planar microelectro-mechanical ("MEMs") film substrate, the film substrate including a first cut-out region rotatably connected to an outer region of the film substrate in a manner to permit controlled free out-of-plane rotation of the first region relative to the outer region, and a second cut-out region rotatably connected to and nested within the first cut-out region in a manner to permit controlled free out-of-plane rotation of the second region relative to the first region, wherein the second cut-out region carries a reflector, and wherein the axis of rotation of the first cut-out region is oriented substantially 90 degrees with respect to the axis of rotation of the second cut-out region, and wherein the cut-out regions are rotated by applying an independent rotational force to each respective cut-out region.

6. A two-axis gimbal comprising a planar microelectromechanical ("MEMs") film substrate, the film substrate including a first cut-out region rotatably connected to an outer region of the film substrate in a manner to permit controlled free out-of-plane rotation of the first region relative to the outer region, and a second cut-out region rotatably connected to and nested within the first cut-out region in a manner to permit controlled free out-of-plane rotation of the second region relative to the first region, wherein the second cut-out region carries an emitter element, and wherein the axis of rotation of the first cut-out region is oriented substantially 90 degrees with respect to the axis of rotation of the second cut-out region.

7. The gimbal of claim 4, including means for moving the first and second cut-out regions relative to each other and relative to the outer region of the film substrate.

8. The gimbal of claim 5, including means for moving the first and second cut-out regions relative to each other and relative to the outer region of the film substrate.

9. The gimbal of claim 6, including means for moving the first and second cut-out regions relative to each other and relative to the outer region of the film substrate.

* * * * *

(12) REEXAMINATION CERTIFICATE (4546th)
United States Patent
Jackson

(10) Number: US 5,920,417 C1
(45) Certificate Issued: Apr. 2, 2002

(54) MICROELECTROMECHANICAL TELEVISION SCANNING DEVICE AND METHOD FOR MAKING THE SAME

(75) Inventor: Michael D. Jackson, Madison, AL (US)

(73) Assignee: Medcam, Inc., Redmond, WA (US)

Reexamination Request:
No. 90/005,760, Jun. 23, 2000

Reexamination Certificate for:
Patent No.: 5,920,417
Issued: Jul. 6, 1999
Appl. No.: 08/583,045
Filed: Apr. 24, 1996

( * ) Notice: This patent is subject to a terminal disclaimer.

(22) PCT Filed: Jul. 19, 1994

(86) PCT No.: PCT/US94/08165

§ 371 Date: Apr. 24, 1996

§ 102(e) Date: Apr. 24, 1996

(87) PCT Pub. No.: WO95/03562

PCT Pub. Date: Feb. 2, 1995

Related U.S. Application Data

(63) Continuation-in-part of application No. 08/093,580, filed on Jul. 19, 1993, now Pat. No. 5,673,139.

(51) Int. Cl.[7] .......................... G02B 26/08; H02K 33/00; H01F 7/08

(52) U.S. Cl. ...................... 359/223; 359/224; 359/298; 335/222; 310/36

(58) Field of Search ................................. 359/198, 199, 359/202, 214, 221, 223, 224, 230, 295, 298, 2, 30; 310/36, 90, 309; 335/222, 223; 345/7, 8

(56) References Cited

U.S. PATENT DOCUMENTS 3,471,641 A    10/1969    Baker et al.

(List continued on next page.)

FOREIGN PATENT DOCUMENTS

| DE | 27 01 730 | 7/1978 |
|---|---|---|
| EP | 0 040 302 B1 | 7/1987 |
| EP | 0 729 265 A1 | 8/1996 |
| GB | 1 596 982 | 12/1981 |
| GB | 2 175 705 A | 12/1986 |
| JP | 60-107017 | 6/1986 |
| JP | 61-118717 | 6/1986 |
| JP | 3-264911 | 11/1991 |
| JP | 406208070 A | 1/1993 |
| JP | 6-180428 | 6/1994 |
| WO | WO92/09133 | 5/1992 |

OTHER PUBLICATIONS

Asada et al., "Silicon Micromachined Two–Dimensional Galvano Optical Scanner", IEEE Transactions on Magnetics, vol. 30, pp. 4647–4649 (1994).

(List continued on next page.)

*Primary Examiner*—Loha Ben

(57) ABSTRACT

A single reflector, two-axis MEMS scanner made of a substrate. The substrate has nested, cut-out regions. Each region is independently rotatable about one of the axes. The axes of the regions are substantially orthogonal.

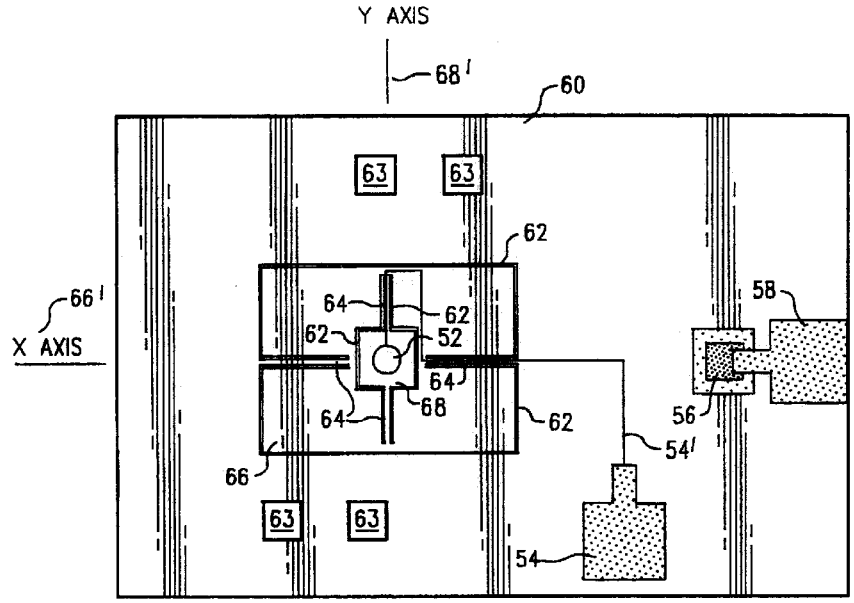

U.S. PATENT DOCUMENTS

| | | |
|---|---|---|
| 4,073,567 A | 2/1978 | Lakerveld et al. |
| 4,230,393 A | 10/1980 | Burke |
| 4,317,611 A | 3/1982 | Petersen |
| 4,421,381 A | 12/1983 | Ueda et al. |
| 4,450,458 A | 5/1984 | Araghi et al. |
| 4,615,595 A | 10/1986 | Hornbeck |
| 4,618,223 A | 10/1986 | Fried |
| 4,708,420 A | 11/1987 | Liddiard |
| 4,854,687 A | 8/1989 | Fletcher |
| 4,942,766 A | 7/1990 | Greenwood et al. |
| 5,016,072 A | 5/1991 | Greiff |
| 5,083,857 A | 1/1992 | Hornbeck |
| 5,097,354 A | 3/1992 | Goto |
| 5,124,879 A | 6/1992 | Goto |
| 5,126,812 A | 6/1992 | Greiff et al. |
| 5,172,262 A | 12/1992 | Hornbeck |
| 5,212,582 A | 5/1993 | Nelson |
| 5,245,463 A | 9/1993 | Goto |
| 5,331,852 A | 7/1994 | Greiff et al. |
| 5,488,862 A | 2/1996 | Neukermans et al. |
| 5,515,724 A | 5/1996 | Greiff et al. |
| 5,536,926 A | 7/1996 | Ikeda et al. |
| 5,606,447 A | 2/1997 | Asada et al. |
| 5,629,790 A | 5/1997 | Neukemans et al. |

OTHER PUBLICATIONS

Jaecklin et al., "Mechanical and Optical Properties of the Surface Micromachined Torsional Mirrors in Silicon, Polysilicon, and Aluminum", 7th Intl'l Conf. On Solid–State Sensors and Actuators, pp. 958–961 (1993).

Ahn et al., "A Fully Integrated Surface Micromachined Magnetic Microactuator with a Multi–Level Meander Magnetic Core", Journal of Microelectrical Mechanical Systems, vol. 2, No. 1, pp. 15–22 (1993).

J. Yao et al., "Fabrication of High Frequency Two Dimensional Nanoactuators for Scanned Probe Devices", IEEE Journal of Microelectromechanical Systems, vol. 1, No. 1, pp. 14–22 (1992).

Feynman, "There's Plenty of Room at the Bottom", IEEE Journal of Microelectromechanical Systems, vol. 1, No. 1, pp. 60–66 (1992).

Breng et al., "Electrostatic Micromechanic Actuators", Journal of Micromechanics and Microengineering, pp. 256–261 (1992).

Buser et al., "Biaxial Scanning Mirror Activated by Bimorph Structures for Medical Applications", Sensors and Actuators A, vol. 31, pp. 29–34 (1992).

Goto & Imanaka, "Super Compact Dual Axis Optical Scanning Unit Applying a Tortional Spring Resonator Driven by a Piezoelectric Actuator", SPIE, vol. 1544, pp. 272–281 (1991).

Wagner et al., "Electromagnetic Microactuators with Multiple Degrees of Freedom", International Conference on Solid–State Sensors and Actuators, IEEE Proceedings, pp. 614–617 (1991).

Greiff et al., "Silicon Monolithic Micromechanical Gyroscope", International Conference on Solid–State Sensors and Actuators, IEEE Proceedings, pp. 966–967 (1991).

Pedder & Howe, "Thermal Assembly of Polysilicon Microstructures," IEEE, CH2957–9/91/0000–0063, pp. 63–68 (1991).

Buser et al., "Very High Q–factor Resonators in Monocrystalline Silicon", Sensors & Actuators, A21–A23, pp. 323–327 (1987).

Three–Terminal Latching Micromechanical Switch, IBM Technical Disclosure Bulletin, vol. 30, No. 6, pp. 393–394 (1987).

Sarro et al., "Silicon Cantilever Beams Fabricated by Electrochemically Controlled Etching for Sensor Application", J. Electrochem. Soc.: Solid–State Science and Technology, pp. 1724–1729 (1986).

Kleiman et al., "Single–Crystal Silicon High–Q Torsional Oscillators," Rv. Sci Instrum. 56(11), pp. 2088–2091 (1985).

Howe & Muller, "Polycrystalline and Amorphous Silicon Micromechanical Beams: Annealing and Mechanical Properties," Sensors and Actuators, vol. 4, pp. 447–454 (1983).

Petersen, "Silicon as a Mechanical Material", Proceedings of the IEEE, vol. 70, No. 5, pp. 420–457 (1982).

Petersen, "Silicon Torsional Scanning Mirror," IBM J. Research Development, vol. 24, No. 5, pp. 631–637 (1980).

Petersen, "Micromechanical Membrane Switches on Silicon", IBM J. Research Development, vol. 23, No. 4, pp. 376–385 (1979).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4, 6, 7 and 9 is confirmed.

Claim1 1 and 5 are determined to be patentable as amended.

Claims 2, 3 and 8, dependent on an amended claim, are determined to be patentable.

1. A two-axis gimbal *operable at a high speed scanning frequency, the scanning frequency being sufficiently high to produce moving images,* comprising a planar microelectro-mechanical ("MEMs") film substrate, the film substrate including a first cut-out region rotatably connected to an outer region of the film subsrate in a manner to permit controlled free out-of-plane rotation of the first region relative to the outer region, and a second cut-out region rotatably connected to and nested within the first cut-out region in a manner to permit controlled free out-of-plane rotation of the second region relative to the first region, and wherein the axis of rotation of the first cut-out region is oriented substantially 90 degrees with respect to the axis of rotation of the second cut-out region, and wherein the cut-out regions are rotated by applying an independent rotational force to each respective cut-out region.

5. A two-axis gimbal *operable at a high speed scanning frequency, the scanning frequency being sufficiently high to produce moving images,* comprising a planar microelectro-mechanical ("MEMs") film substrate, the film substrate including a first cut-out region rotatably connected to an outer region of the film substrate in a manner to permit controlled free out-of-plane rotation of the first region relative to the outer region, and a second cut-out region rotatably connected to and nested within the first cut-out region in a manner to permit controlled free out-of-plane rotation of the second region relative to the first region, wherein the second cut-out region carries a reflector, and wherein the axis of rotation of the first cut-out region is oriented substantially 90 degrees with respect to the axis of rotation of the second cut-out region, and wherein the cut-out regions are rotated by applying an independent rotational force to each respective cut-out region.

* * * * *